(12) United States Patent
Ogata et al.

(10) Patent No.: US 7,040,652 B2
(45) Date of Patent: May 9, 2006

(54) HEAD PROTECTING AIRBAG DEVICE

(75) Inventors: Tetsuya Ogata, Aichi-ken (JP);
Eishichi Nakamura, Aichi-ken (JP);
Toshinori Tanase, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 11/028,302

(22) Filed: Jan. 4, 2005

(65) Prior Publication Data

US 2005/0121884 A1 Jun. 9, 2005

Related U.S. Application Data

(62) Division of application No. 10/299,656, filed on Nov. 20, 2002, now Pat. No. 6,860,506.

(30) Foreign Application Priority Data

Nov. 22, 2001 (JP) ............................. 2001-358093

(51) Int. Cl.
*B60R 21/16* (2006.01)
(52) U.S. Cl. ..................... 280/730.2; 280/740; 280/742
(58) Field of Classification Search ............. 280/730.2, 280/736, 740, 742, 729
See application file for complete search history.

(56) References Cited

U.S. PATENT DOCUMENTS 5,536,041 A   7/1996  Acker et al.
6,070,903 A   6/2000  Beisswenger et al.
6,293,581 B1  9/2001  Saita et al.
6,299,200 B1  10/2001 Bowers et al.
6,439,604 B1  8/2002  Al-Amin et al.
6,497,429 B1  12/2002 Matsumoto
6,601,871 B1  8/2003  Fischer
6,705,636 B1  3/2004  Takahara
6,811,184 B1 * 11/2004 Ikeda et al. ................. 280/742
2002/0175508 A1 11/2002 Hess et al.
2003/0090093 A1 5/2003  Ikeda et al.

FOREIGN PATENT DOCUMENTS

JP   A-2000-296753   10/2000
WO   WO 00/69690 A1  11/2000

\* cited by examiner

*Primary Examiner*—Ruth Ilan
(74) *Attorney, Agent, or Firm*—Posz Law Group, PLC

(57) ABSTRACT

In a head protecting airbag device, an airbag includes an inflation portion and a connection port portion. The connection port portion includes: an outlet side portion having a communication port to the inflation portion at its lower end; and an inlet side portion for inserting an inflator therein. The inflator includes a body portion having a gas discharge port, and a diffuser having a gas outlet port. The diffuser is connected with the body portion so as to cover the gas discharge port, having its two ends forced into contact with the outer circumference of the body portion. The inflator is connected to a connection port portion with good sealing properties and the gas outlet port faces toward the communication port of the connection port portion and thus toward the inflation portion. This head protecting airbag device simplifies the connection structure between the inflator and the airbag while retaining the quick expansion and inflation of the airbag.

4 Claims, 11 Drawing Sheets

HEAD PROTECTING AIRBAG DEVICE

This application is a divisional application of U.S. patent application Ser. No. 10/299,656 filed Nov. 20, 2002 is now U.S. Pat. No. 6,860,506, which claims priority from Japanese patent application of Ogata et al., filed Nov. 22, 2001, No. 2001-358093, the complete disclosure of which is hereby incorporated into the present application by this reference.

This application claims priority from Japanese patent application of Ogata et al, filed Nov. 22, 2001, No. 2001-358093, the complete disclosure of which is hereby incorporated into the present application by this reference.

BACKGROUND OF THE INVENTION

1. Field of the Invention

The present invention relates to a head protecting airbag device. The airbag of the head protecting airbag device is folded and housed in the upper peripheral edge of a window in the interior side of a vehicle so that it may be expanded and inflated, when it admits an inflating gas, to cover the interior side of the window.

2. Description of the Related Art

Usually in the head protecting airbag device of this kind, an inflated airbag protects an occupant. Therefore, the head protecting airbag device is desired, when activated, to develop the airbag quickly. The construction of Unexamined Published Japanese Patent Application No. 2000-296753 is known as the head protecting airbag device which is constructed to expand the airbag quickly.

This head protecting airbag device is provided with two connection port portions at the upper edge side near the longitudinal middle of the airbag. These two connection port portions are opposed to each other in the longitudinal direction. The front and rear ends of the inflator are individually inserted into the two connection port portions so that the inflator is connected with the two connection port portions in a straight line.

When this airbag device is activated, the inflating gas is discharged from the two ends of the inflator in the axial direction of the inflator. Then, the inflating gas flows, through the two connection port portions of the airbag, in two directions, i.e., to the front side and to the rear side in the longitudinal direction of the vehicle so as to inflate the airbag.

In the head protecting airbag device of the prior art, however, the inflating gas, as discharged from the two ends of one inflator, is guided into the airbag through the two connection port portions. In other words, the airbag device of the prior art has two connection portions which connect the inflator and the connection port portions of the airbag. Therefore, in the head protecting airbag device of the prior art, the connecting work becomes complicated in the light of sealing properties, which caused a large number of working steps and a high cost.

Especially in the head protecting airbag device of the prior art, the front and rear ends of the inflator are individually inserted into the connection port portions. These connection port portions have to be sealed up by forcing them to contact with the outer circumference of the inflator. However, the inflator and the two connection port portions are connected in a straight line so that the inflating gas discharged in the axial direction of the inflator flows in the axial directions of the individual connection port portions. In other words, the connection port portions are easily pulled out from the end portions of the inflator if a pressure put on the individual connection port portions against the outer circumference of the inflator is low. This makes it necessary to connect the individual connection port portions and the inflator with great connection strength, including sealing properties. As a result, the head protecting airbag device of the prior art needs a large number of working-steps and thus high cost for assembly.

SUMMARY OF THE INVENTION

The present invention is intended to solve the above-specified problems. Specifically, the invention has the objective of providing a head protecting airbag device which simplifies the connection structure between an inflator and an airbag while retaining a quick expansion and inflation of the airbag and which reduces the number of working-steps and the cost of its assembly.

A head protecting airbag device according to the present invention comprises an airbag and an inflator for feeding an inflating gas to the airbag. The airbag is folded and housed at the upper peripheral edge of the window along the longitudinal direction on the interior side of a vehicle and is expanded and inflated downward when it admits an inflating gas to cover the interior side of the window. Moreover, the airbag includes an inflation portion and one cylindrical connection port portion. The inflation portion is inflated when it admits the inflating gas to separate an interior side wall portion and an exterior side wall portion of the airbag, thereby to shield the window. The connection port portion is arranged at generally the middle in the vehicle longitudinal direction of the upper edge of the airbag and is formed to communicate with the inflation portion, protruding upward from the inflation portion. The connection port portion guides the inflating gas from the inflator to the inflation portion. The connection port portion includes an outlet side portion and an inlet side portion. The outlet side portion has a generally vertical axial direction and has a communication port at its lower end for communicating with the inflation portion, to release the inflating gas to the inflation portion. The inlet side portion is arranged above the outlet side portion and is connected to the inflator for admitting the inflating gas from the inflator. Moreover, the inflator includes a body portion and a diffuser. The body portion is formed into a cylinder having a gas discharge port opened on the outer circumference for discharging the inflating gas. The diffuser is formed of a metal into a cylindrical shape to cover the gas discharge port of the body portion, and is attached to the body by pressing the two ends on the outer circumferential surface of the body. Moreover, the diffuser has a gas outlet port opened on its outer circumference for releasing the inflating gas. The inflator is inserted into the inlet side portion of the connection port portion of the airbag and is connected to the connection port portion with good sealing. Thus, the inflator is arranged to have its gas outlet port opposed to the communication port of the connection port portion and to face toward the inflation portion.

Here, close to the longitudinal middle of the airbag where the connection port portion is arranged is not limited to the longitudinal center of the airbag but means the position at which a part of the inflation portion is arranged on both the front side and the rear side of the connection port portion.

In the head protecting airbag device according to the invention, when activated, the inflating gas discharged from the gas discharge port of the body portion of the inflator goes through the clearance between the outer circumference of the body portion and the inner circumference of the diffuser and flows into the single connection port portion of the airbag. Moreover, the inflating gas is released from the communication port of the connection port portion into the inflation portion of the airbag. Then, the airbag inflates at its inflation portion by admitting the inflating gas so that it is expanded downward from the upper edge of the window.

Specifically, in the head protecting airbag device of the present invention, the inflating gas from the inflator is fed to the inner side of the airbag through the single connection port portion. Unlike the prior art in which the two ends of the inflator are connected to the two connection port portion, therefore, the airbag device of the invention has its connection with the inflator through a single connection port portion. Therefore, it is easy to connect the inflator and the connection port portion.

When the inflating gas flows into the inflation portion of the airbag, on the other hand, the gas outlet port of the inflator is opposed to the communication port at the lower end of the connection port portion and face toward the inflation portion. The gas outlet port is opened on the outer circumference of the diffuser and is axially directed generally perpendicular to the axial direction of the inflator. Specifically, the communication port in the outlet side portion of the connection port portion is axially directed generally perpendicular to the axial direction of the inflator, as the gas outlet port. As a result, the inlet side portion of the connection port portion into which the inflator is inserted is roughly perpendicular to the axial direction of the communication port, that is, is bent generally perpendicular to the outlet side portion of the connection port portion.

Therefore, the inflating gas from the inflator is injected generally perpendicular to the axial direction of the body portion or the diffuser of the inflator so that it flows into the outlet side portion and further into the inflation portion of the airbag. At this time, even if the outlet side portion is given downward force by the injection force of the inflating gas, the inner circumference of the inlet side portion, especially, the portion away from the communication port, is held by the portion of the outer circumference of the inflator away from the communication port, so that the outlet side portion is prevented from separating from the inflator. As a result, even if the connection structure between the inflator and the inlet side portion of the connection port portion is simplified to weaken the connection strength, the inflator itself holds the connection port portion with a part of its outer circumference, when the airbag device acts. Specifically, even if the connection structure between the inflator and the inlet side portion of the connection port portion is simplified, and thereby weakening the connection strength, it is possible to prevent the connection port portion from separating from the inflator.

On the other hand, the assembly of the diffuser with the body portion of the inflator is made by the simple structure in which the two ends of the diffuser are pressed on the body portion. However, the inflating gas is injected generally perpendicular to the axis of the body portion or the diffuser from the gas outlet port of the diffuser. Thus, even if the assembling force of the two ends of the diffuser to the body portion is weak, therefore, the diffuser is prevented from separating from the body portion. As a result, the inflator itself can be assembled by connecting the diffuser and the body portion simply.

The inflating gas that flows into the inflation portion of the airbag naturally flows toward the longitudinal middle position of the inflation portion through the connection port portion. Therefore, the inflating gas promptly reaches the two longitudinal ends of the inflation portion so that the airbag device can retain quick expansion and inflation of the inflation portion of the airbag.

In the head protecting airbag device according to the invention, therefore, the quick expansion and inflation of the airbag is retained while simplifying the connection structure between the inflator and the airbag. In the airbag device of the invention, moreover, the inflator itself can be simply assembled and thereby the number of working-steps and the cost of its assembly are reduced.

Moreover, the diffuser of the inflator are so assembled on the body portion as to force the two ends of the diffuser to contact with the body portion. In short, the diffuser overlaps the body portion so that the inflator can be compactly constructed without elongating its axial length.

Moreover, it is desired that two gas outlet ports are arranged in the diffuser for releasing the inflating gas in two directions obliquely, i.e., forward and downward, and rearward and downward. In this construction, the inflating gas flows in the two directions, i.e., forward and downward, and rearward and downward, into the inflation portion from the two gas outlet ports of the diffuser through the communication port of the outlet side portion. Therefore, the inflating gas smoothly reaches the two longitudinal ends of the inflation portion so that the airbag can retain a quicker expansion and inflation.

Moreover, it is desired that the gas outlet port is arranged at the side of the center or the end portion of the inflator on the side apart from the gas discharge port in case the gas discharge port is arranged close to the end portion of the body portion. This construction enables the use of an inflator in which the side of the gas discharge port of the body portion cannot be inserted into the inlet side portion of the connection port portion, such as an inflator of a stored gas type which is charged with a cold gas. In a stored gas type inflator, specifically, the actvating lead wires are arranged at the end on the side where the gas discharge port of the body portion is arranged. An inflator of this kind is inserted from the end portion thereof on which no lead wires are arranged into the inlet side portion of the connection port portion so that the end to which the lead wires are connected may be exposed from the opening of the inlet side portion of the connection port portion. With the aforementioned construction, the gas outlet port of the diffuser is smoothly arranged to face the communication port.

Moreover, it is desired that the inlet side portion of the connection port portion of the airbag is arranged along the longitudinal direction of the vehicle. With this construction, the inflator is inserted into the inlet side portion while the inlet side portion of the connection port portion of the airbag is arranged in the longitudinal direction of the vehicle, i.e., in parallel to the inflation portion of the airbag. Therefore, the inflator is easily arranged in the narrow space on the upper edge side of the windows of the vehicle.

Still moreover, the connection port portion of the airbag may have the inlet side portion bent from the outlet side portion, to have an L-shape.

Moreover, the inlet side portion is opened on both front and rear ends and is formed to protrude to the front and rear sides from the upper side of the outlet side portion. It is desired that the inlet side portion is sealed on the inflator at two portions of the front and rear sides on either side of the outlet side portion, by being pressed against the outer circumference of the inflator along the circumferential direction. With this construction, the outlet side portion constitutes the vertical rod portion of the T-shape whereas the inlet side portion constitutes the horizontal rod portion of the T-shape, so that the connection port portion forms a T-shape.

Moreover, the two sealed portions of the inlet side portion are formed at the front and rear ends on either side of the outlet side portion, so that the inflator may be inserted from either side of the ends of the inlet side portion. As a result, the flexibility of connecting the inflator and the airbag is increased. Moreover, the sealed portions of the inlet side portion on the inflator are individually formed by being pressed against the outer circumference of the inflator along the circumferential direction, although they are formed at two positions of front and rear sides on either side of the outlet side portion. Specifically, the sealed portions retain the sealing pressure in the circumferential direction or in the direction generally perpendicular to the injection direction of the inflating gas which is injected from the gas outlet port of the diffuser. Therefore, the sealed portions of the inlet side portion retain the sufficient sealing properties even if the sealing pressure is not high. As a result, the sealing structure of the inlet side portion and the inflator is simplified, maintaining good workability in connecting the inflator and the connection port portion.

Moreover, it is desired that the inflator is attached to the vehicular body at two positions of the front and rear sides on either side of the outlet side portion. With this construction, the inflator itself is stably mounted on the vehicular body. When the inflator is activated, moreover, pressure is applied to the outlet side portion in the direction away from the inflator by the injection force of the inflating gas. However, the inflator is inserted into the inlet side portion which is protruded to the front and rear above the outlet side portion. Therefore, the inflator itself restricts the movement of the outlet side portion at its two ends of the inlet side portion on either side of the outlet side portion, thereby to support the connection port portion stably.

Moreover, it is desired that the sealed portion of the diffuser has a clearance from the outer circumference of the body portion, in case the inlet side portion is sealed on the outer circumference of the inflator at least at one position by being pressed against the circumference of the diffuser along the circumferential direction. With this construction, even if the sealing pressure for sealing the inlet side portion on the diffuser is raised to a predetermined or higher level, the diffuser can be warped to narrow the clearance from the body portion. Therefore, the sealing pressure on the inlet side portion need not be strictly set, which facilitates the connecting work of the connection port portion and the diffuser.

Moreover, the gas outlet port of the diffuser may be arranged to project into the outlet side portion closer to the inflation portion. With this construction, the inflating gas flows smoothly into the inflation portion.

Moreover, it is desired that the inflation portion of the airbag includes a feed passage portion and a shielding body portion. The feed passage portion is arranged on the upper edge side of the airbag to communicate with the connection port portion, and extends in the longitudinal direction of the vehicle. The shielding body portion is arranged below the feed passage portion, and substantially covers the interior side of the window when inflated. Moreover, the shielding body portion includes a plurality of vertical cells lined up in the longitudinal direction of the vehicle so as to inflate into vertical rod shapes with the inflating gas introduced through the feed passage portion into the inflation portion. With this construction, the inflating gas flowing into the airbag flows into the feed passage portion which is arranged in the longitudinal direction of the vehicle on the upper edge of the airbag. Therefore, the vertical cells on the front and rear ends of the inflation portion are smoothly inflated so that the airbag attains quick expansion and inflation.

In this case, the airbag may also be constructed in the following manner. The inflation portion of the airbag includes a communication passage portion arranged along the longitudinal direction of the vehicle on the lower edge side of the airbag for providing communications between the individual vertical cells and the lower end. One of the vertical cells is arranged right below the connection port portion in the airbag with its opening narrowed on the side of the feed passage portion. The front and rear adjacent vertical cells thereof are individually closed at their upper ends.

With this construction, the vertical cell just below the connection port portion has a narrowed opening on the side of the feed passage portion, and the two vertical cells on the two sides thereof are closed at their upper ends. Therefore, the inflating gas flowing from the outlet side portion of the connection port portion into the inflation portion is prevented from flowing in a large quantity into the vertical cells in the vicinity of the connection port portion. In other words, the inflating gas flowing from the outlet side portion into the inflation portion is smoothly guided to the front and rear sides of the feed passage portion. Further, a part of the inflating gas smoothly flows from the vertical cell just below the connection port portion, through a communication passage portion, into the vertical cells at the front and rear ends of the inflation portion. Therefore, the quick expansion and inflation of the airbag are more promoted.

Figure 1:
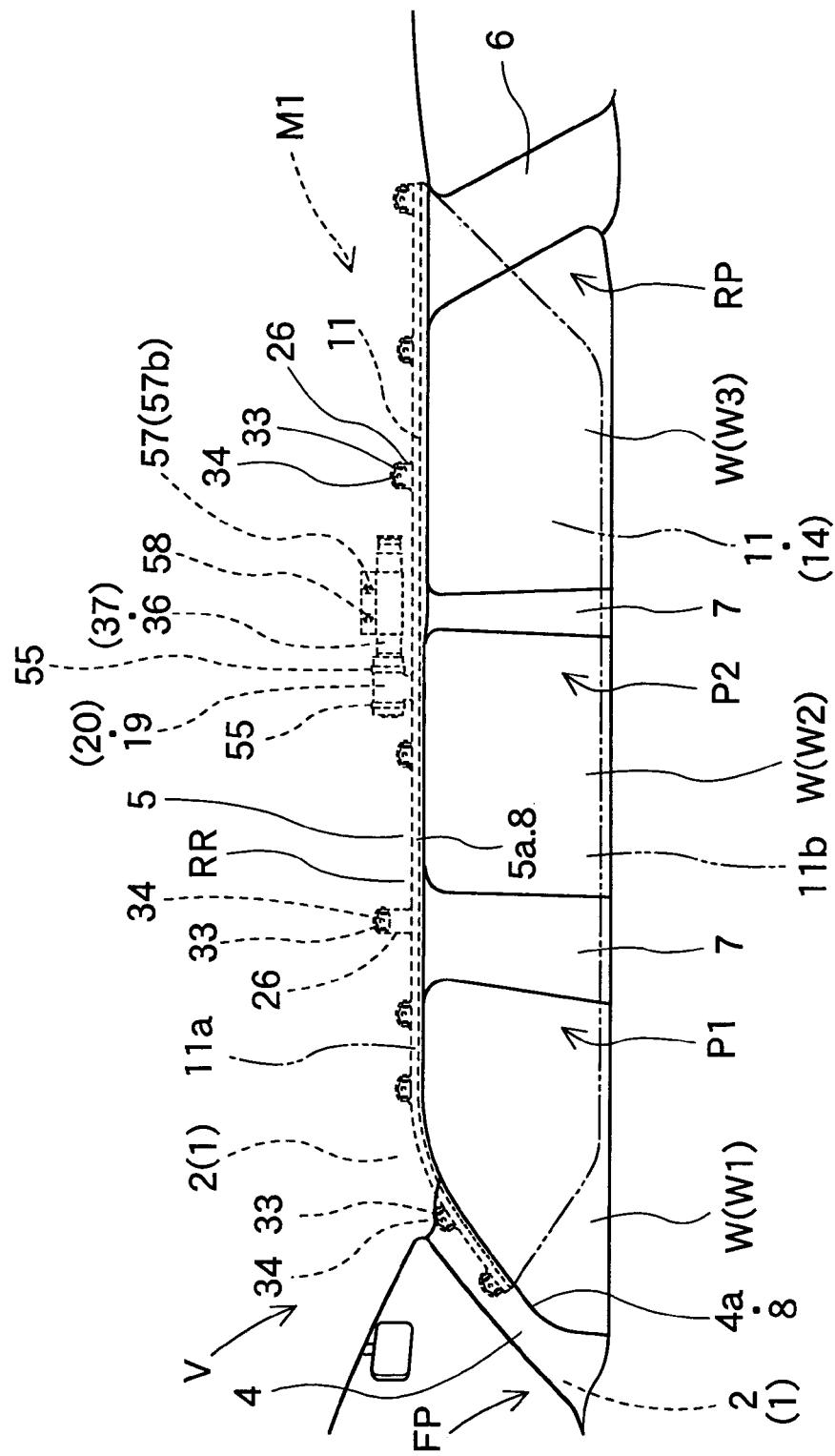
FIG. 1 is a schematic front elevation showing the used state of a head protecting airbag device according to a first embodiment of the invention, as taken from the interior side of a vehicle.

DESCRIPTION OF THE PREFERRED
EMBODIMENTS

The invention will be described below by way of embodiments shown in the drawings. In addition, the invention is not limited to the embodiments. All modifications within the requirements of the claims and equivalents with respect to the requirements should be included in the scope of the claims.

As shown in FIG. 1, a head protecting airbag device M1 according to one embodiment of the invention includes an airbag 11. The airbag 11 folded is housed in the lower edge of a front pillar portion FP, the lower edge of a roof side rail portion RR and above a rear pillar portion RP in the upper peripheral edge of windows W (W1, W2 and W3) on the interior side of a vehicle V. Here in the vehicle V of the embodiment, two first and second intermediate pillar portions P1 and P2 are arranged between the front pillar FP and the rear pillar portion RP. The airbag 11 is housed to extend over those pillar portions P1 and P2.

The airbag device M1 is constructed to include the airbag 11, an inflator 36, mounting brackets 33 and 57, clamps 55 and an airbag cover 8.

The airbag cover 8 is built, as shown in FIG. 1, of the lower edges 4a and 5a of a front pillar garnish 4 and a roof head lining 5. The front pillar garnish 4 is arranged in the front pillar portion FP, and the roof head lining 5 is arranged in the roof side rail portion RR. The airbag cover 8 is arranged to cover the interior side of the airbag 11 folded and housed. Moreover, the cover 8 is constructed to open into the interior of the vehicle by the push of the airbag 11 so that the airbag 11 being expanded and inflated may protrude into the vehicular compartment.

Figure 2:
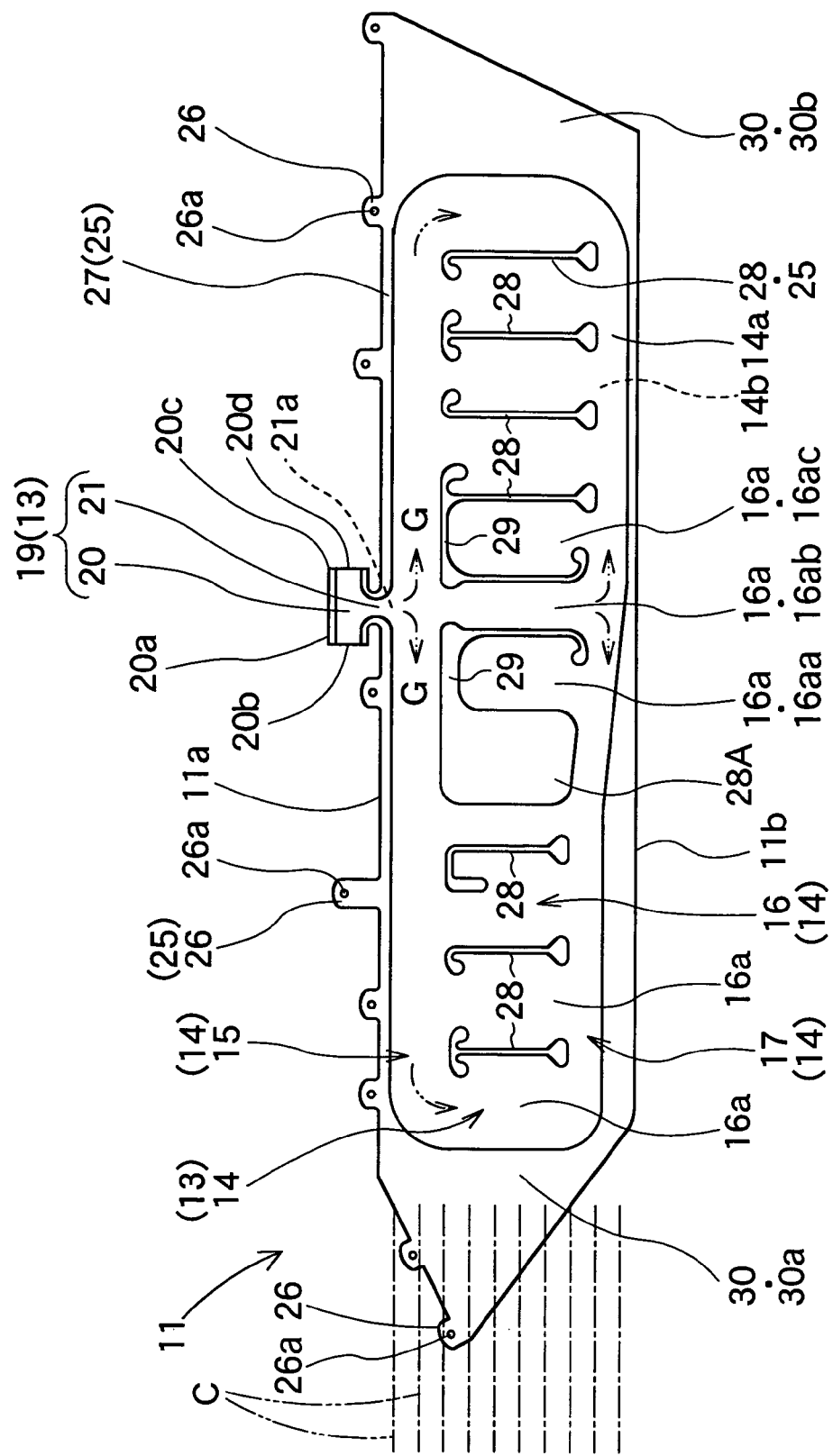
FIG. 2 is a front elevation of an airbag to be used in the first embodiment.
Figure 3:
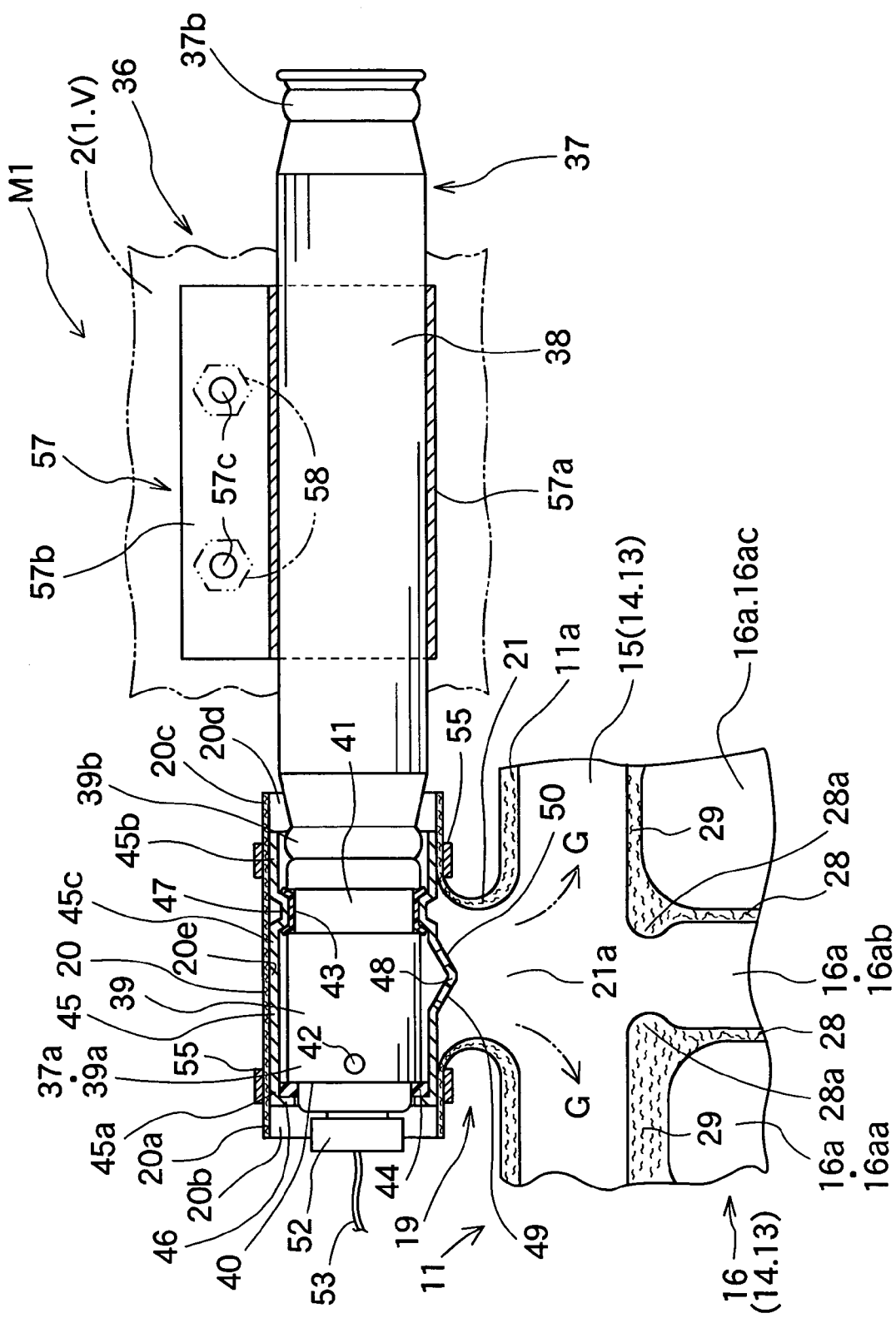
FIG. 3 is a partially enlarged section of the vicinity of an inflator in the airbag device of the first embodiment.

The airbag 11 is manufactured by hollow-weaving of polyamide yarns or the like. The housed airbag 11 is expanded and inflated downward from the upper edge side of the window W by admitting an inflating gas G from the inflator 36, as shown in FIGS. 1 to 3. Then, the airbag 11 having completed its inflation covers the interior side of the windows WI, W2 and W3 and the pillar garnishes 7 and 6 of the first and second intermediate pillar portions P1 and P2 and the rear pillar portion RP. On the other hand, referring now to FIG. 2 the airbag 11 comprises a gas inlet portion 13 admitting the inflating gas G therein, and a blocking portion 25 which allows no inflating gas G to pass therein.

The gas inlet portion 13 is provided with an inflation portion 14 and a connection port portion 19. The inflation portion 14 is inflated, when the inflating gas G flows in, to separate an interior side wall portion 14a and an exterior side wall portion 14b. The inflation portion 14 which has completed its inflation shields the windows W and covers the interior sides of the pillar portions P1 and P2. The connection port portion 19 guides the inflating gas G from the inflator 36 into the inflation portion 14. The connection port portion 19 is formed in a T-shaped cylinder, as viewed from the interior compartment, and is arranged at generally the middle in the vehicular longitudinal direction at the upper edge 11a of the airbag 11. The connection port portion 19 communicates with the inflation portion 14 and is protruded upward from the inflation portion 14.

The inflation portion 14 includes a feed passage portion 15, a shielding body portion 16 and a communication passage portion 17. The feed passage portion 15 is arranged at the side of the upper edge 11a of the airbag 11 and in the longitudinal direction of the vehicle V. The shielding body portion 16 is arranged below the feed passage portion 15 and substantially covers the interior sides of the windows W and the pillar portions P1 and P2. The communication passage portion 17 is arranged on the side of the lower edge 11b of the airbag 11 and in the longitudinal direction of the vehicle. In the shielding body portion 16, there are longitudinally juxtaposed a plurality of vertical cells 16a which bulge in vertical rod shapes. The feed passage portion 15 is formed to feed the inflating gas G smoothly to the two front and rear ends of the inflation portion 14. The individual vertical cells 16a communicate at their upper end sides with the feed passage portion 15, excepting the vertical cells 16aa and 16ac adjoining the vertical cell 16ab just below the connection port portion 19. Moreover, the individual vertical cells 16a communicate at their lower ends with the communication passage portion 17. This communication passage portion 17 feeds the inflating gas G having reached the lower end of the vertical cell 16ab, smoothly to the two front and rear sides of the inflation portion 14.

The connection port portion 19 includes an inlet side portion 20 and an outlet side portion 21. The inlet side portion 20 is so connected to the inflator 36 as to admit the inflating gas G from the inflator 36. The outlet side portion 21 releases the inflating gas G to the inflation portion 14. The outlet side portion 21 is formed into a generally cylindrical shape having an axis generally in the vertical direction. The outlet side portion 21 is provided at its lower end with a communication port 21a, which communicates with the feed passage portion 15 of the inflation portion 14. The inlet side portion 20 is arranged above the outlet side portion 21. The inlet side portion 20 is formed into a generally cylindrical shape having an axis in the longitudinal direction of the vehicle, and is provided with openings 20b and 20d in its two front and rear end portions 20a and 20c. The outlet side portion 21 communicates at its upper end with the longitudinal middle of the inlet side portion 20.

The blocking portion 25 is constructed by joining the interior side wall portion 14a and the exterior side wall portion 14b. In the case of the embodiment, the blocking portion 25 is constructed of mounting portions 26, a peripheral edge portion 27, thickness regulating portions 28, connection portions 29 and board portions 30.

The peripheral edge portion 27 is arranged adjacent to the gas inlet portion 13. The peripheral edge portions 27 are densely woven to cause no gas leakage. The mounting portions 26 are provided in plurality (e.g., nine in the embodiment) and are individually protruded upward from the peripheral edge portion 27 at the upper edge 11a and from triangular board portions 30a of the airbag 11. To each mounting portion 26, there is fixed a mounting bracket 33 for attaching the airbag 11 to the body 1 of the vehicle V. Moreover, each mounting portion 26 is provided with a mounting hole 26a through which to insert a mounting bolt 34. The individual mounting portions 26 are fixed together with the mounting brackets 33 on an inner panel 2 of sheet metal on the side of the body 1 by using the mounting bolts 34.

The board portions 30 are arranged to maintain the entire shape of the airbag 11 and to reduce the volume of the gas inlet portion 13. The board portions 30 helps shorten the time period for the airbag 11 to start and complete its inflation. Moreover, the board portions 30 are composed of the triangular board 30a arranged on the front end side of the airbag 11, and a triangular board 30b arranged on the rear end side of the airbag 11. The thickness regulating portions 28 are so vertically arranged as to divide the individual vertical cells 16a. Here, the thickness regulating portion 28A on the front of the vertical cell 16aa is made to have a larger width than that of the remaining thickness regulating portions 28.

The connection portions 29 close off the upper side of the vertical cells 16aa and 16ac by connecting the thickness regulating portions 28 and 28 across the individual vertical cells 16aa and 16ac.

Moreover, the thickness regulating portions 28 and 28 located just below the connection port portion 19 and on the upper end side of the vertical cell 16ab and opposed to each other, are provided with projections 28a for narrowing the opening of the vertical cell 16ab. These projections 28a prevent the inflating gas G flowing from the outlet side portion 21 of the connection port portion 19 to the inflation portion 14, from flowing in a large amount into the vertical cell 16ab. Therefore, the inflating gas G flowing from the outlet side portion 21 into the inflation portion 14 is easily guided to the front and rear of the feed passage portion 15 by those projections 28a.

Figure 4:
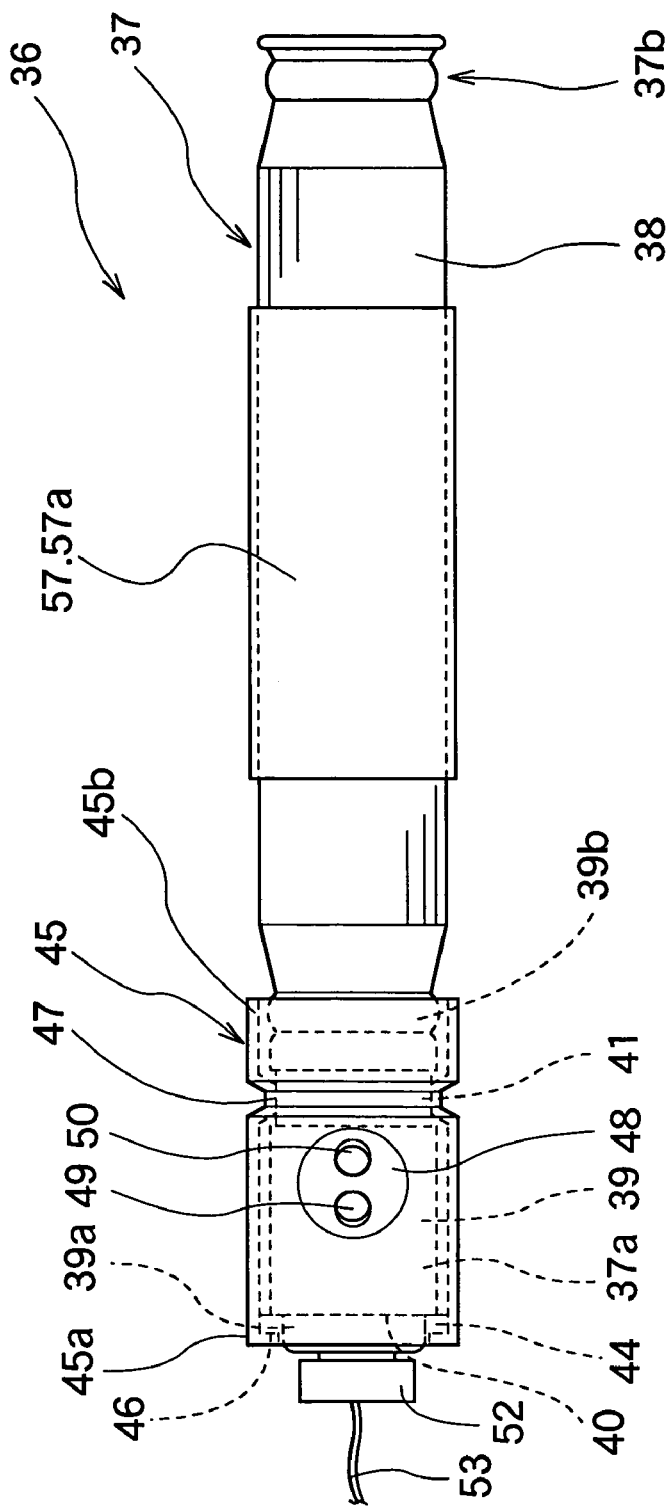
FIG. 4 is a bottom view of an inflator to be used in the first embodiment.

As shown in FIGS. 1, 3 and 4, the inflator 36 is constructed to include a body portion 37 and a diffuser 45. The body portion 37 is formed into a cylinder and has gas discharge ports 42 opened on its outer circumference for discharging the inflating gas G. The diffuser 45 is formed of a metal into a generally cylindrical shape for covering the gas discharges ports 42 of the body portion 37. The diffuser 45 is connected to the body portion 37 by forcing a root end of the diffuser onto a head portion of the body portion 37.

The body portion 37 is of the stored gas type, which is charged with a cold gas. The body portion 37 is constructed of a generally column-shaped base portion 38 arranged on the side of a rear end 37b, and a generally column-shaped head portion 39 having a slightly smaller diameter than the base portion 38 and arranged at the front end (or leading end) 37a. The gas discharge ports 42 are arranged on the outer circumference closer to the leading end 39a of the head portion 39. With the leading end face of the head portion 39, there is connected a connector 52 for inputting an activation signal from the activation circuit of the airbag device M1. Here, reference numeral 53 in FIG. 3 designates a lead wire. On the side of a root portion 39b of the head portion 39, on the other hand, there is arranged throughout the circumference a groove 41 for mounting the diffuser 45. Throughout the circumference of the leading end of the head portion 39, moreover, there is formed an inward step 40 for mounting the diffuser 45.

The diffuser 45 is formed of a sheet metal into a generally cylindrical shape. The diffuser 45 is provided, on the side of its leading end (or front end) 45a, with a flange portion 46, which is protruded in the inner circumferential direction. The diffuser 45 is provided, on the side of its root portion (or rear end) 45b, with a caulking portion (or plastically deformed portion) 47 to be fitted in the groove 41 of the body portion 37. In front of the caulking portion 47, there is formed a bottomed cylindrical bulge 48, which is protruded downward. The bulge 48 is formed into a conical shape having two gas outlet ports 49 and 50 opened in a circular shape. These gas outlet ports 49 and 50 release the inflating gas individually downward generally perpendicularly to the axial direction of the body portion 37 of the inflator 36 and the diffuser 45. More specifically, the gas outlet port 49 releases the inflating gas G obliquely, forward and downward. When the airbag device is mounted on the vehicle, moreover, the inflating gas G, as released from the gas outlet port 49, is guided via the communication port 21a of the outlet side portion 21 of the connection port portion 19 to the front side of the feed passage portion 15 in the inflation portion 14 of the airbag 11. Moreover, the gas outlet port 50 releases the inflating gas G obliquely, rearward and downward. When the airbag device is mounted on the vehicle, moreover, the inflating gas G released from the gas outlet port 50 is guided through the communication port 21a of the outlet side portion 21 of the connection port portion 19 to the rear side of the feed passage portion 15 in the inflation portion 14 of the airbag 11.

The diffuser 45 has an O-ring 44 arranged on the inner side face of the flange portion 46. When the diffuser 45 is assembled with the body portion 37, it is mounted from its root portion 45b on the head portion 39 of the body portion 37, and the flange portion 46 is brought in contact through the O-ring 44 to the step 40. If the caulking portion 47 is fitted in the groove 41, the front and rear ends 45a and 45b are assembled with good sealing with the head portion 39 of the body portion 37. As a result, the diffuser 45 is assembled with the body portion 37, so that the inflator 36 is assembled. Here, numeral 43 in FIG. 3 designates a ring spacer of a synthetic resin, which is arranged on the outer circumference of the groove 41 so as to protect the groove 41 from any damage.

When the inflator 36 assembled is connected to the connection port portion 19, the diffuser 45 is inserted into the inlet side portion 20 in the connection port portion 19 of the airbag 11 with the gas outlet ports 49 and 50 being directed downward. Then, the front and rear end portions 20a and 20c of the inlet side portion 20 are held by the clamps 55 and pressed onto the outer circumferences of the front and rear ends 45a and 45b of the diffuser 45. Thus, the inflator 36 is connected to the connection port portion 19. At this connecting time, the gas outlet ports 49 and 50 of the diffuser 45 face opposite the communication port 21a from above, and are arranged to face toward the feed passage portion 15 of the inflation portion 14.

The clamps 55 are formed of a sheet metal into an annular shape. And, these clamps 55 are plastically deformed partially into a smaller internal diameter thereby to force the front and rear end portions 20a and 20c of the inlet side portion 20 in the connection port portion 19 to contact with the entire outer circumference of the end portions 45a and 45b of the diffuser 45.

The mounting bracket 57 has a holding portion 57a and a mounting portion 57b. The holding portion 57a sheathes and clamps the base portion 38 of the body portion 37 of the inflator 36. The mounting portion 57b is protruded from the holding portion 57a. The mounting portion 57b is provided with mounting holes 57c and 57c for inserting mounting bolts 58 therethrough. The individual mounting bolts 58 are fastened on the inner panel 2 on the side of the body 1 of the interior side of the roof side rail portion RR. The mounting bracket 57 is mounted and fixed on the inner panel 2 on the side of the body 1 of the roof side rail portion RR by means of the mounting bolts 58 while holding the inflator body portion 37 with the holding portion 57a.

Here will be described how to mount the airbag device M1 on the vehicle V. First of all, the airbag 11 is so folded into a bellows shape from its flat and expanded state sequentially with folds C of crests and valleys as to bring the side of the lower edge 11b of the airbag 11 toward the side of the upper edge 11a, as indicated by double-dotted lines in FIG. 2. The airbag 11 is wrapped, after folded up, at predetermined portions with not-shown unfolding preventing breakable tape. Moreover, the mounting brackets 33 are attached to the individual mounting portions 25. Moreover, the clamps 55 are made in advance to sheathe the two end portions 20a and 20b of the inlet side portion 20 in the connection port portion 19.

Here, the inflator 36 is assembled in advance by mounting the diffuser 45 on the body portion 37.

Thereafter, as described hereinbefore, the diffuser 45 is inserted, with the gas outlet ports 49 and 50 facing downward, from the side of the rear end portion 20c into the inlet side portion 20 in the connection port portion 19 of the airbag 11. Moreover, the clamps 55 and 55 are fastened to force the front and rear end portions 20a and 20c of the inlet side portion 20 to contact with the outer circumferences of the front and rear ends 45a and 45b of the diffuser 45. As a result, the inflator 36 is connected to the connection port portion 19 thereby to form the airbag assembly.

At this time, the gas outlet ports 49 and 50 of the diffuser 45 are opposed to the communication port 21a of the connection port portion 19 and directed toward the side of the feed passage portion 15 of the inflation portion 14.

Here, the mounting bracket 57 may be attached to the inflator body portion 37 either in advance or after the diffuser 45 was assembled.

After this, the individual mounting brackets 33 and 57 are arranged at predetermined positions of the inner panel 2, and the airbag assembly is attached to the body 1 by means of the bolts 34 and 58. Next, the connector 52 having the lead wires 53 extended from a predetermined inflator activating control device is joined to the leading end face of the inflator body portion 37. Then, the pillar garnishes 4, 6 and 7 and the roof head lining 5 are attached to the body 1 so that the airbag device M1 can be mounted on the vehicle V.

If the inflator 36 is activated after the airbag device M1 is mounted on the vehicle V, the inflating gas G is discharged from the gas discharge ports 42 of the body portion 37 of the inflator 36. The inflating gas G is released through the clearance between the outer circumference of the body portion 37 and the inner circumference of the diffuser 45 and flows from the gas outlet ports 49 and 50 of the diffuser 45 into the single connection port portion 19 of the airbag 11, as indicated by double-dotted lines in FIGS. 2 and 3. Moreover, the inflating gas G flows from the communication port 21a of the connection port portion 19 into the inflation portion 14 of the airbag 11. Then, the airbag 11 is expanded downward from the upper edge side of the windows W by inflating the inflation portion 14.

In the head protecting airbag device M1 of the first embodiment, the inflating gas G from the inflator 36 is fed to the inside of the airbag 11 through the single connection port portion 19. In the airbag device M1, specifically, the inflator is connected to the single connection port portion 19, not like the prior art in which the two ends of the inflator are connected to two connecting ports. In the airbag device M1 of the first embodiment, therefore, it is easy to connect the inflator 36 and the connection port portion 19.

In the airbag device M1 of the first embodiment, on the other hand, the gas outlet ports 49 and 50 of the inflator 36 are opposed to the communication port 21a at the lower end of the connection port portion 19 and arranged toward the side of the feed passage portion 15 of the inflation portion 14. The gas outlet ports 49 and 50 are opened on the outer circumference of the diffuser 45 and are axially directed generally perpendicular to the axial direction of the body portion 37 of the inflator 36 and the diffuser 45 of the inflator 36. Therefore, the communication port 21a in the outlet side portion 21 of the connection port portion 19 is axially directed like the gas outlet ports 49 and 50 generally perpendicular to the axial direction of the inflator 36. In short, the inlet side portion 20 of the connection port portion 19 having the inflator 36 inserted thereinto is arranged in the vehicle V generally perpendicular to the axial direction of the communication port 21a, that is, bent generally perpendicular to the outlet side portion 21.

With this construction, the inflating gas G from the inflator 36 is injected downward or in the direction generally perpendicular to the axial direction of the body portion 37 or the diffuser 45 of the inflator 36 so that it flows into the outlet side portion 21 and further into the inflation portion 14 of the airbag 11. Therefore, the outlet side portion 21 is held firmly by the inflator 36 even if downward pressure is applied to try to separate the outlet side portion 21 from the inflator 36 by the injection force of the inflating gas G. Specifically, the inner circumference of the inlet side portion 20, especially, the upper side inner circumference 20e on the side apart from the communication port 21a is held firmly by the upper side outer circumference 45c of the outer circumference of the diffuser 45 of the inflator 36 positioned opposite from the communication port 21a, so that the outlet side portion 21 is prevented from separating from the inflator 36. As a result, even if the connection structure between the inflator 36 and the inlet side portion 20 of the connection port portion 19 is simplified to weaken the clamping force of the clamps 55 and 55, i.e., the connection strength, the inflator 36 itself holds the connection port portion 19 firmly with the portion 45c of its outer circumference, when the airbag device M1 acts, thereby to prevent the connection port portion 19 from separating from the inflator 36.

In this airbag device M1, on the other hand, the assembly of the diffuser 45 with the body portion 37 of the inflator 36 is made by the simple structure, in which the two ends 45a and 45b of the diffuser 45 are pressed against the body portion 37. However, the inflating gas G is injected downward generally perpendicular to the axis of the body portion 37 or the diffuser 45 from the gas outlet ports 49 and 50 of the diffuser 45. Even if the assembling force of the two ends 45a and 45b of the diffuser 45 to the body portion 37 is weak, therefore, the diffuser 45 is prevented from separating from the body portion 37. As a result, the inflator 36 itself is assembled by simply connecting the diffuser 45 and the body portion 37.

Of course, the inflating gas G flowing into the inflation portion 14 of the airbag 11 flows toward the longitudinal middle of the inflation portion 14 through the connection port portion 19. Therefore, the inflating gas G promptly reaches the two longitudinal ends of the inflation portion 14 so that the airbag device M1 attains quick expansion and inflation of the individual vertical cells 16a in the inflation portion 14 of the airbag 11.

In the head protecting airbag device M1 of the first embodiment, therefore, the quick expansion and inflation of the airbag 11 is retained while simplifying the connection structure between the inflator 36 and the airbag 11 and facilitating the assembly of the inflator 36 itself. Therefore, the airbag device M1 can reduce the number of working-steps and the cost of assembly.

Moreover, the diffuser 45 and the inflator 36 are so assembled on the body portion 37 as to force the root end of the diffuser onto a head portion of the body portion 37. In short, the diffuser 45 and the body portion 37 overlap each other. In the airbag device M1, therefore, the inflator 36 is compactly constructed without any axial elongation of the inflator 36.

In the first embodiment, moreover, the inflating gas G flows in the two oblique directions, i.e., forward and downward, and rearward and downward, into the feed passage portion 15 of the inflation portion 14 from the two gas inlet ports 49 and 50 of the diffuser 45 through the communication port 21a of the outlet side portion 21. Therefore, the inflating gas G smoothly reaches the two longitudinal ends of the inflation portion 14 so that the airbag 11 attains an even quicker expansion and inflation.

Especially in the case of the first embodiment, the inflating gas G flows into the feed passage portion 15 which is arranged in the longitudinal direction of the vehicle V on the side of the upper edge 11a of the airbag 11. Therefore, the vertical cells 16 on the front and rear ends of the inflation portion 14 can be easily inflated so that the airbag 11 achieves quick expansion and inflation.

In the first embodiment, moreover, inflation portion 14 of the airbag 11 is so provided with the communication passage portion 17 as to extend in the longitudinal direction of the vehicle V on the side of the lower edge 11b of the airbag 11. Therefore, the inflating gas G easily flows from the vertical cell 16ab through the communication passage portion 17 smoothly into the vertical cells 16a at the front and rear ends of the inflation portion 14 thereby to promote the quicker expansion and inflation of the airbag 11.

In the first embodiment, on the other hand, the inlet side portion 20 of the connection port portion 19 of the airbag 11 is arranged along the longitudinal direction of the vehicle V. In this construction, the inflator 36 is inserted into the inlet side portion 20. In the airbag device M1, therefore, the inflator 36 can be arranged in the longitudinal direction of the vehicle V in parallel with the inflation portion 14 of the airbag 11. As a result, in the airbag device M1, the inflator 36 can be easily arranged in the thin roof side rail portion RR on the upper edge side of the windows W of the vehicle V.

In the first embodiment, moreover, the inlet side portion 20 of the airbag 11 is opened at its front and rear ends 20a and 20c and is protruded from the upper portion of the outlet side portion 21 toward the both front and rear directions. Moreover, the inlet side portion 20 is sealed against the inflator 36 at two positions of the front and rear ends 20a and 20c on either side of the outlet side portion 21 by the pressure on the outer circumference of the diffuser 45. In other words, the airbag 11 forms the connection port portion 19 into a T-shape having the outlet side portion 21 as its vertical rod and the inlet side portion 20 as the horizontal rod. Moreover, the two sealed portions of the inlet side portion 20 are formed at the front and rear ends 20a and 20c on either side of the outlet side portion 21. In the first embodiment, therefore, the inflator 36 can be inserted from either the front or rear end 20a and 20c of the inlet side portion 20 so that the flexibility in connecting the inflator 36 and the airbag 11 is increased.

The embodiment is exemplified by the case in which the flange portion 46 of the diffuser 45 is inserted from the side of the rear end 20c of the inlet side portion 20 when the inflator 36 and the airbag 11 are connected. In case the lead wires 53 are connected in advance with the inflator 36, however, the inflator 36 may be inserted into the inlet side portion 20 by inserting the base portion 38 of the body portion 37 from the side of the front end 20a of the inlet side portion 20.

Here in the construction thus far described, the two sealed portions of the inlet side portion 20 on the inflator 36 are formed at the front and rear ends 20a and 20c on either side of the outlet side portion 21. However, those two sealed portions are individually formed by being pressed on the circumferential direction on the outer circumference of the diffuser 45. Specifically, in the sealed portions, sealing pressure is secured in the circumferential direction of the diffuser 45 generally perpendicular to the injection direction of the inflating gas G to be injected downward from the gas outlet ports 49 and 50. Therefore, those sealed portions retains sufficient sealing properties even if the pressure is not high. In the first embodiment, therefore, the individual sealed portions are enabled to retain the sufficient sealing properties even by the simple construction using the clamps 55 and 55 which are fixed by plastic deformation. In the first embodiment, therefore, the sealing structure is simplified to improve the connecting work of the inflator 36 and the connection port portion 19.

Figure 5:
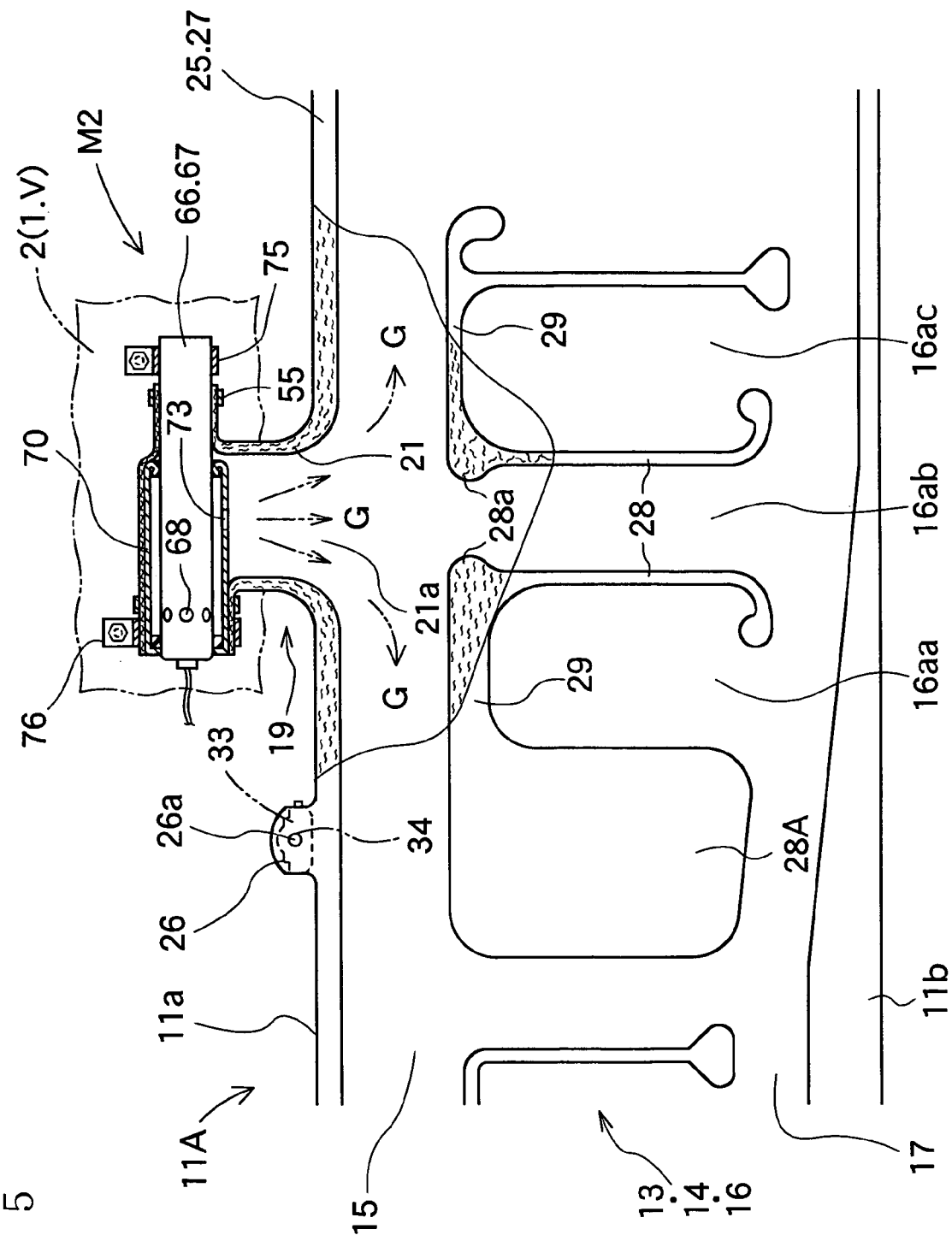
FIG. 5 is a partially enlarged section of the vicinity of a connection port portion of an airbag in an airbag device according to a second embodiment.
Figure 6:
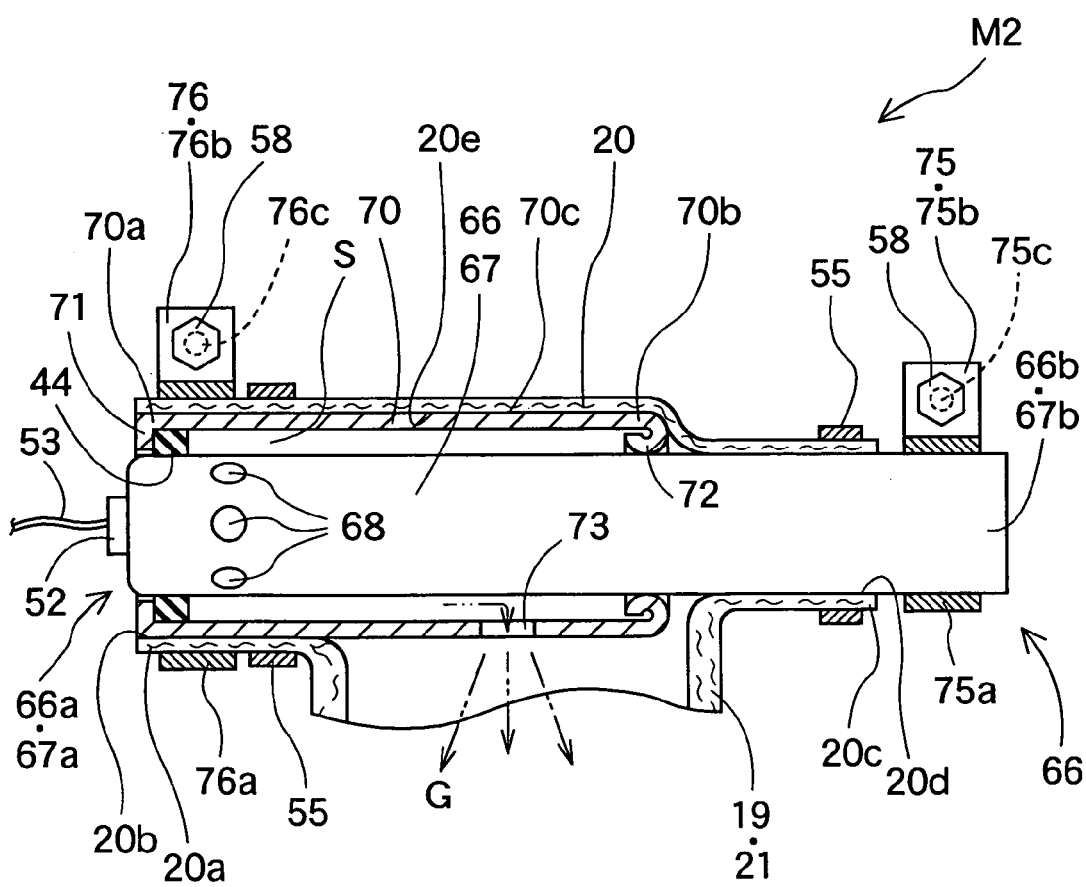
FIG. 6 is a partially enlarged section of the vicinity of an inflator in the airbag device of the second embodiment.

Here will be described a head protecting airbag device M2 of a second embodiment, as shown in FIGS. 5 and 6. In this second embodiment, an inflator 66 is partially different from that of the first embodiment, and an airbag 11A is different from the airbag 11 of the first embodiment. In this airbag device M2, moreover, there are used two mounting brackets 75 and 76 for mounting the inflator 66 on the vehicle V.

Here, the individual mounting brackets 75 and 76 include radially reducible cylindrical holding portions 75a and 76a, and mounting portions 75b and 76b having mounting holes 75c and 76c for inserting the mounting bolts 58 thereinto. And, the mounting bracket 75 is mounted and fixed on the inner panel 2 by the bolt 58 while holding the outer circumference of the root portion 67b of a body portion 67 with the holding portion 75a. The mounting bracket 76 is mounted and fixed on the inner panel 2 by the bolt 58 while holding the outer circumference of a leading end 70a of a diffuser 70, which is sheathed by the inlet side portion 20 of the connection port portion 19, with the holding portion 76a.

And, the airbag 11A is constructed like the airbag 11 excepting that the outlet side portion of the connection port portion 19 in the airbag 11A is slightly vertically longer than that of the airbag 11. Therefore, the description of the portions of the airbag 11A similar to those of the airbag 11 will be omitted, including the inlet side portion 20 of the connection port portion 19 to insert the inflator 66 thereinto, designating them the same reference numerals as those of the airbag 11.

Moreover, the inflator 66 of the second embodiment includes the body portion 67 and the diffuser 70, as shown in FIGS. 5 and 6. The body portion 67 is formed into a cylinder type having gas discharge ports 68 opened on its outer circumference for discharging the inflating gas G. The diffuser 70 is formed of a metal into a generally cylindrical shape and is assembled with the body portion 67 while covering the gas discharge ports 68, by being pressed on the outer circumference of the body portion 67 at the two ends.

The generally cylindrical body portion 67 is of a stored gas type, which is charged with a cold gas. The body portion 67 has a plurality of gas discharge ports 68 in the outer circumference of the side of a front end 67a, and the connector 52 having the lead wires 53 connected thereto is jointed to the end face of the front end 67a. The diffuser 70 is provided on the side of its leading end (or front end) 70a with a flange portion 71 protruded in the inner circumferential direction, and on the side of its root portion (or rear end) 70b with curved portion 72, which is curved toward the inner circumference to come into contact with the entire outer circumference of the body portion 67. In the lower portion toward the lower end 70b of the diffuser 70, moreover, there is formed one gas outlet port 73, which is opened in a circular shape and is perpendicular to the axial direction of the body portion 67 of the inflator 66 and the diffuser 70. This gas outlet port 73 releases the inflating gas G downward. When mounted on the vehicle, the inflating gas G released from the gas outlet port 73 is guided into the feed passage portion 15 in the inflation portion 14 of the airbag 11A through the communication port 21a of the outlet side portion 21 of the connection port portion 19.

The diffuser 70 is assembled with the body portion 67 by arranging the O-ring 44 at the inner side face of the flange portion 71 and by sheathing the body portion 67 in the curved portion 72 at the root portion 70b from the front end 67a. Then, the side of the flange portion 71 is forced to contact with the outer circumference of the leading end 67a while interposing the O-ring 44, and the curved portion 72 is pressed against the outer circumference of the root portion 67b. Thus, the front and rear ends 70a and 70b are connected to the outer circumference of the body portion 67 with good sealing properties. As a result, the diffuser 70 is assembled with the body portion 67 and so the inflator 66 is assembled.

The inflator 66 thus assembled has its gas outlet port 73 directed downward, and its rear end 66b is inserted from the side of the front end portion 20a so that the diffuser 70 is inserted into the inlet side portion 20 of the connection port portion 19 of the airbag 11A. Then, the front and rear end portions 20a and 20c of the inlet side portion 20 are held by the clamps 55 to contact forcibly with the front and rear ends 66a and 66b of the inflator 66, i.e., with the outer circumference near the front end 70a of the diffuser 70 and near the root portion 67b of the body portion 67. Thus, the inflator 66 is connected to the connection port portion 19.

At this connecting time, the airbag 11A is folded as in the first embodiment, and has the mounting brackets 33 attached thereto. Moreover, the gas outlet port 73 of the diffuser 70 faces opposite the communication port 21a of the connection port portion 19 above the communication port 21a and thus is directed toward the feed passage portion 15 of the inflation portion 14.

After the inflator 66 is connected to the connection port portion 19, the airbag 11A and the inflator 66 are mounted and fixed on the vehicle V by using the mounting bolts 34 and 58, as in the first embodiment. Thus, the airbag device M2 is mounted on the vehicle V.

In this second embodiment, too, the inflating gas G is discharged from the gas discharge ports 68 of the body portion 67 of the inflator 66, if the inflator 66 is activated after mounted on the vehicle V. The inflating gas G discharged is released from the gas outlet port 73 of the diffuser 70 through the clearance between the outer circumference of the body portion 67 and the inner circumference of the diffuser 70 into the single connection port portion 19 of the airbag 11A, as indicated by two-dotted lines in FIGS. 5 and 6. Moreover, the inflating gas G flows from the communication port 21a of the connection port portion 19 into the inflation portion 14 of the airbag 11A. Then, the airbag 11A admits the inflating gas G to inflate the inflation portion 14 so that it is expanded downward from the upper edge sides of the windows.

In this head protecting airbag device M2 of the second embodiment, too, the inflating gas G from the inflator 66 is fed through the single connection port portion 19 into the airbag 11A. Specifically, in this airbag device M2, too, the inflator 66 is connected to the single connection port portion 19, instead of the construction of the prior art in which the both ends of the inflator are connected to two connection ports, so that the inflator 66 and the connection port portion 19 are easily connected to each other.

Moreover, the inflating gas G from the inflator 66 is injected downward, or in the direction perpendicular to the axial direction of the body portion 67 and the diffuser 70 of the inflator 66 into the outlet side portion 21 and further into the inflation portion 14 of the airbag 11A. Therefore, the injection force of the inflating gas G tries to move the outlet side portion 21 downward away from the inflator 66. However, the inner circumference of the inlet side portion 20, especially, the upper side inner circumference 20e on the side apart from the communication port 21a, is held firmly by the upper side outer circumference 70c of the diffuser 70 of the inflator 66 opposite from the communication port 21a. Therefore, the outlet side portion 21 is prevented from separaing from the inflator 66. As a result, the inflator 66 itself holds firmly the connection port portion 19 by the portion 70c of its outer circumference when the airbag device M2 acts, even if the connection structure between the inflator 66 and the inlet side portion 20 of the connection port portion 19 is simplified to weaken the fastening force of the clamps 55 and 55 and weaken the connection strength. Therefore, this airbag device M2 also prevents the connection port portion 19 from separating from the inflator 66.

In this airbag device M2, on the other hand, the assembly of the diffuser 70 with the body portion 67 in the inflator 66 is made by a simple structure in which the two ends 70a and 70b of the diffuser 70 are pressed against the outer circumference of the body portion 67. However, the inflating gas G is injected downward, or in the direction generally perpendicular to the axis of the body portion 67 or the diffuser 70 from the gas outlet port 73 of the diffuser 70. Even if the assembling force of the two ends 70a and 70b of the diffuser 70 to the body portion 67 is weak, therefore, the diffuser 70 is prevented from separating from the body portion 67. As a result, in this airbag device M2, too, assembly of the diffuser 70 and the body portion 67 is easily done to form the inflator 66.

The inflating gas G flowing into the inflation portion 14 of the airbag 11A naturally flows toward the longitudinal middle of the inflation portion 14 through the connection port portion 19. Therefore, the inflating gas G promptly reaches the two longitudinal ends of the inflation portion 14, so that the airbag 11A quickly expands and inflates the individual vertical cells 16a in the inflation portion 14.

In the head protecting airbag device M2 of the second embodiment, therefore, the quick expansion and inflation of the airbag 11A is secured while simplifying the connection structure between the inflator 66 and the airbag 11A and the assembly of the inflator 66. As a result, the airbag device M2 also reduces the number of steps and the cost of assembly.

In the second embodiment, too, the diffuser 70 of the inflator 66 is so mounted around the body portion 67 as to force the two ends 70a and 70b to contact with the body portion 67. Therefore, the inflator 66 itself is compactly constructed without elongating its axial length.

In the second embodiment, moreover, the gas discharge ports 68 of the inflator 66 are arranged toward the front end 67a of the body portion 67. However, the gas outlet port 73 is arranged close to the middle of the axial direction of the inflator 66, on the side away from the gas discharge ports 68. With this construction, even the inflator 66 of the stored gas type can feed the inflating gas G smoothly into the airbag 11A. In this inflator 66, specifically, the activating lead wires 53 are connected to the end portion 67a (or the front end 66a of the inflator 66), close to which the gas discharge ports 68 of the body portion 67 are arranged. The side of the end portion 66b of the inflator 66 where no lead wire 53 is arranged, is inserted into the inlet side portion 20 of the connection port portion 19 so that the end portion 66a of the inflator 66, where the lead wires 53 are arranged, may be exposed from the opening 20b of the inlet side portion 20 of the connection port portion 19. Thus, the gas outlet port 73 of the diffuser 70 is smoothly opposed to the communication port 21a.

In this second embodiment, too, the inlet side portion 20 of the connection port portion 19 of the airbag 11A is arranged, like the airbag 11, in the longitudinal direction of the vehicle V. Therefore, the inflator 66 is easily arranged in the thin roof side rail portion on the upper edge side of the windows of the vehicle V.

Still moreover, the inlet side portion 20 of the airbag 11A is opened at both front and rear ends 20a and 20c, and is protruded to the front and rear sides above the outlet side portion 21. Moreoever, the two sealed portions of the inlet side portion 20 on the inflator 66 are formed at the front and rear ends 20a and 20c on either side of the outlet side portion 21, and are pressed on the outer circumference of the inflator 66 in the circumferential direction. Therefore, the inlet side portion 20 of the inflator 66 can retain the sufficient sealing properties by the simple construction using the clamps 55 and 55 fixed by plastic deformation. Moreover, the inflator 66 can be inserted from either side of the front and rear ends 20a and 20c of the inlet side portion 20 thereby to increase the flexibility in connecting the inflator 66 and the airbag 11A.

In the second embodiment, still moreover, the front and rear sides of the inflator 66 on either side of the outlet side portion 21, that is, the outer circumference of the front end 70a of the diffuser 70 and the outer circumference of the root portion 67b of the body portion 67, are mounted on the inner panel 2 on the side of the body 1 by means of the mounting brackets 75 and 76. Therefore, the inflator 66 itself is stably mounted on the inner panel 2. When the inflator 66 acts, moreover, the injection force of the inflating gas G applies a pressure on the outlet side portion 21 in the direction away from the inflator 66. However, the inflator 66 is inserted into the inlet side portion 20 which is protruded to the front and rear sides of the inlet side portion 20 above the outlet side portion 21. Therefore, the inflator 66 itself can suppress the movement of the inlet side portion 20 by the two end portions 20a and 20c of the inlet side portion 20 with the outlet side portion 21 in between, thereby to support the connection port portion 19 stably.

Figure 7:
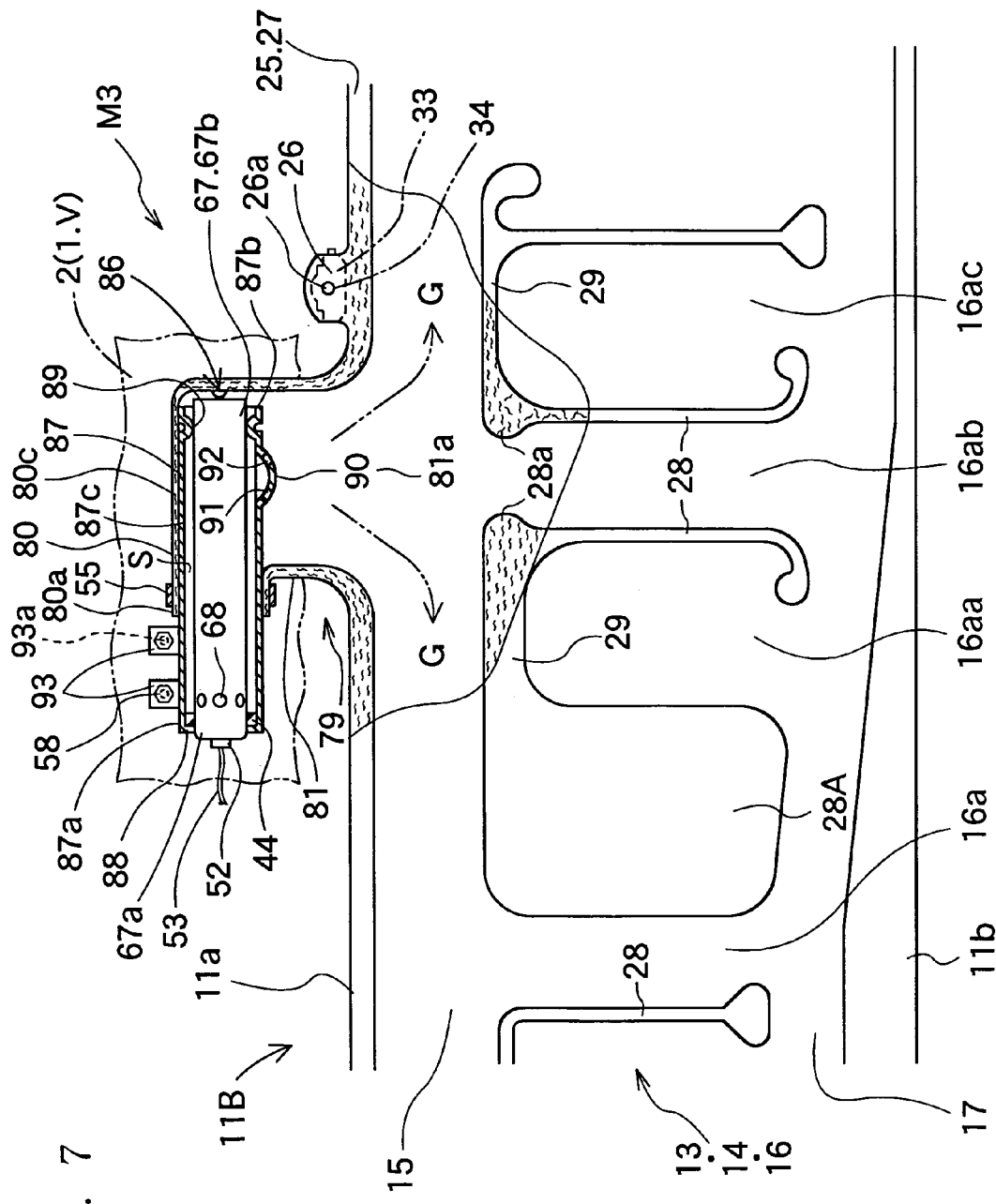
FIG. 7 is a partially enlarged section of the vicinity of a connection port portion of an airbag in an airbag device according to a third embodiment.
Figure 8:
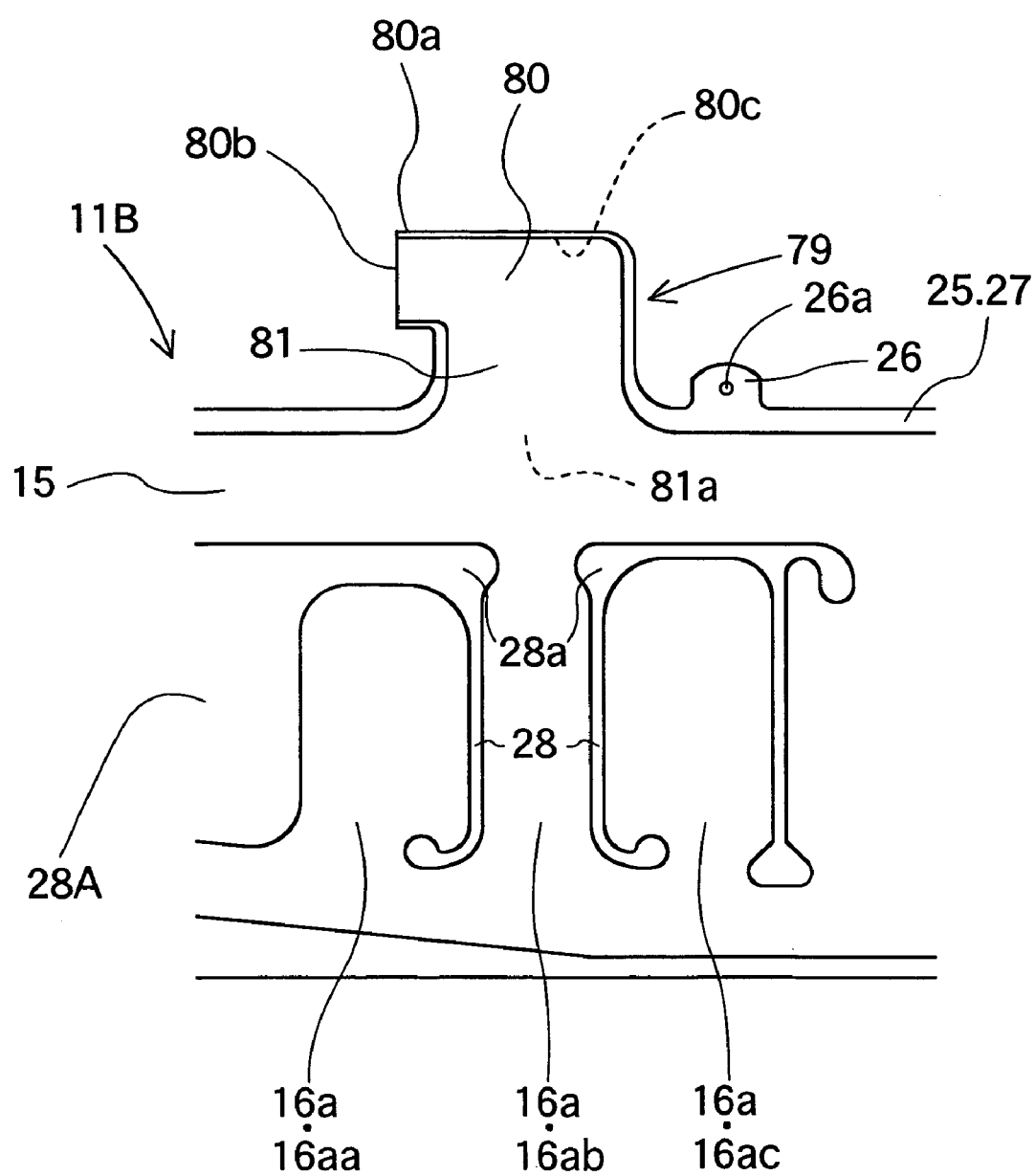
FIG. 8 is a partial front elevation of the vicinity of the connection port portion of the airbag used in the third embodiment.

Here in the airbags 11 and 11A of the first and second embodiments, the connection port portion 19 is formed into the T-shape, as viewed from the interior side, to open at the front and rear ends 20a and 20c of the inlet side portion 20 to be connected to the inflators 36 and 66. As a connection port portion 79 of an airbag 11B of a third embodiment shown in FIGS. 7 and 8, however, an inlet side portion 80 may be bent into an L-shape from an outlet side portion 81. Specifically, this connection port portion 79 is provided with the outlet side portion 81 and the inlet side portion 80. The outlet side portion 81 has a communication port 81a opened in its lower end for communicating with the feed passage portion 15 in the inflation portion 14 of the airbag 11B. The inlet side portion 80 is bent from the upper side of the outlet side portion 81 toward the front side of the vehicle V and is provided an opening 80b in its front end 80a. Here, the airbag 11B is different in the construction of the connection port portion 79 and in the position of the mounting portions 26, but the remaining constructions are similar to those of the airbags 11 and 11A.

Moreover, an inflator 86 of this airbag device M3 of the third embodiment is provided with a diffuser 87 and the body portion 67 identical to that of the second embodiment. The diffuser 87 is formed of a sheet metal into a generally cylindrical shape and is assembled with the body portion 67 to cover the gas discharge ports 68 of the body portion 67 and to have its two ends pressed on the outer circumference of the body portion 67.

The diffuser 87 is provided close to its leading end (or front end) 87a with a flange portion 88 protruded in the inner circumferential direction and on the side of its root portion (or rear end) 87b with a curved portion 89, which is curved toward the inner circumference side and is forced into contact with the entire outer circumference of the body portion 67. Below the vicinity of the side of the rear end 87b of the diffuser 87 (or the rear end of the inflator 86), moreover, there is formed a generally semispherical bulge 90, which is protruded downward. This bulge 90 releases the inflating gas G downward or in the direction generally perpendicular to the axial direction of the body portion 67 and the diffuser 87 of the inflator 86. The bulge 90 is provided with two gas outlet ports 91 and 92, each of which is opened in a circular shape for discharging the inflating gas G. When the airbag device is mounted on the vehicle, more specifically, the gas outlet port 91 releases the inflating gas G obliquely, forward and downward to guide the gas G, through the communication port 81a of the outlet side portion 81 of the connection port portion 79, to the front of the feed passage portion 15 in the inflation portion 14 of the airbag 11B. In the meantime, the gas outlet port 92 releases the inflating gas G obliquely, rearward and downward to guide the gas G, through the communication port 81a of the outlet side portion 81 of the connection port portion 79, to the rear of the feed passage portion 15 in the inflation portion 14 of the airbag 11B.

Moreover, this diffuser 87 is provided with two brackets 93 for mounting the inflator 86 on the inner panel 2 by means of the bolts 58. Each of these brackets 93 is provided with a mounting hole 93a for inserting the bolt 58 thereinto.

The inflator 86 is assembled by arranging the O-ring 44 in the inner side face of the flange portion 88 and by mounting the curved portion 89 of the side of the root portion 87b from the side of the front end 67a of the body portion 67. The flange portion 88 is put in contact with the outer circumference of the leading end 67a interposing the O-ring 44, and the curved portion 89 is pressed against the outer circumference of the root portion 67b. Thus, both front and rear ends 87a and 87b are connected with the outer circumference of the body portion 67 with good sealing properties. As a result, the inflator 86 is assembled.

For connecting the assembled inflator 86 to the connection port portion 79, moreover, the root portion 87b of the diffuser 87 is inserted, with the gas outlet ports 91 and 92 directed downward, from the opening 80b of the front end 80a into the inlet side portion 80 in the connection port portion 79 of the airbag 11B. Moreover, the vicinity of the front end portion 80a of the inlet side portion 80 is forced, while being held by the clamps 55, to contact with the vicinity of the longitudinal center of the inflator 86, or the vicinity of the middle of the diffuser 87 and the flange 88. Thus, the inflator 86 and the connection port portion 79 are connected.

At this connecting time, the airbag 11B is folded as in the first embodiment, and has the mounting brackets 33 attached thereto. Moreover, the gas outlet ports 91 and 92 of the diffuser 87 face toward the communication port 81a of the connection port portion 79 above the communication port 81a and are arranged toward the feed passage portion 15 of the inflation portion 14.

After the inflator 86 is connected to the connection port portion 79, the airbag 11B and the inflator 86 are mounted and fixed on the vehicle V by using the mounting bolts 34 and 58, as in the first embodiment. Thus, the airbag device M3 can be mounted on the vehicle V.

In this third embodiment, when the inflator 86 acts, the inflating gas G is discharged from the gas discharge ports 68. And, the gas G is injected from the gas outlet ports 91 and 92 of the diffuser 87 through the clearance between the outer circumference of the body portion 67 and the inner circumference of the diffuser 87 and flows through the single connection port portion 79 near the longitudinal middle of the airbag 11B to the front side and the rear side in the feed passage portion 15 of the inflation portion 14 in the airbag 11B. Even if the outlet side portion 81 tries to leave the inflator 86, the upper side inner circumference 80c of the inlet side portion 80 is held firmly by the upper side outer circumference 87c of the diffuser 87 of the inflator 86, thereby to suppress the movement of the outlet side portion 81. Therefore, the third embodiment achieves the same working-effects as those of the first embodiment, excepting that the inlet side portion 80 of the connection port portion 79 in the airbag 11B is not provided with both front and rear openings on either side of the outlet side portion 81.

In this third embodiment, the sealed portions on the outer circumference of the inflator 86 on the side of the end portion 80a of the inlet side portion 80 are forced to contact in the circumferential direction with the outer circumference of the diffuser 87. Moreover, the sealed portion of the diffuser 87 is spaced by a clearance S from the outer circumference of the body portion 67. Even if the clamp 55 is fastened with more sealing pressure for sealing the inlet side portion 80 on the diffuser 87 than a predetermined level, therefore, the diffuser 87 is warped to narrow the clearance S in between the body portion 67. As a result, the sealing pressure need not be strictly set, which facilitates the connecting work of the connection port portion 79 and the diffuser 87.

Here, in the second embodiment, as shown in FIG. 6, the clearance S also is formed between the outer circumference of the body portion 67 and the inner circumference of the diffuser 70 at the connection portion by the clamps 55 between the diffuser 70 and the vicinity of the front end 20a of the inlet side portion 20 of the connection port portion 19. Therefore, the aforementioned working-effects are also attained in the second embodiment.

In the third embodiment, moreover, the connection port portion 79 of the airbag 11B is formed into an L-shape, as viewed from the interior side, and is provided with the outlet side portion 81 extending upward from the inflation portion 14 and the inlet side portion 80, bent to the front from the upper side of the outlet side portion 81. However, the connection port portion 79 itself need not be formed into the L-shape, as long as it is formed, together with the airbag 11B, of a flexible woven fabric. For example, the connection port portion may be projected either straight upward from the side of the upper edge 11a of the airbag 11B or obliquely forward or rearward while communicating with the inflation portion 14. When mounted on the vehicle, then, the connection port portion thus formed may be bent in the L-shape to provide the side of the inflation portion 14 of the connection port portion as the outlet side portion, and the side connected to the inflator in which the inflator is inserted as the inlet side portion.

Figure 9:
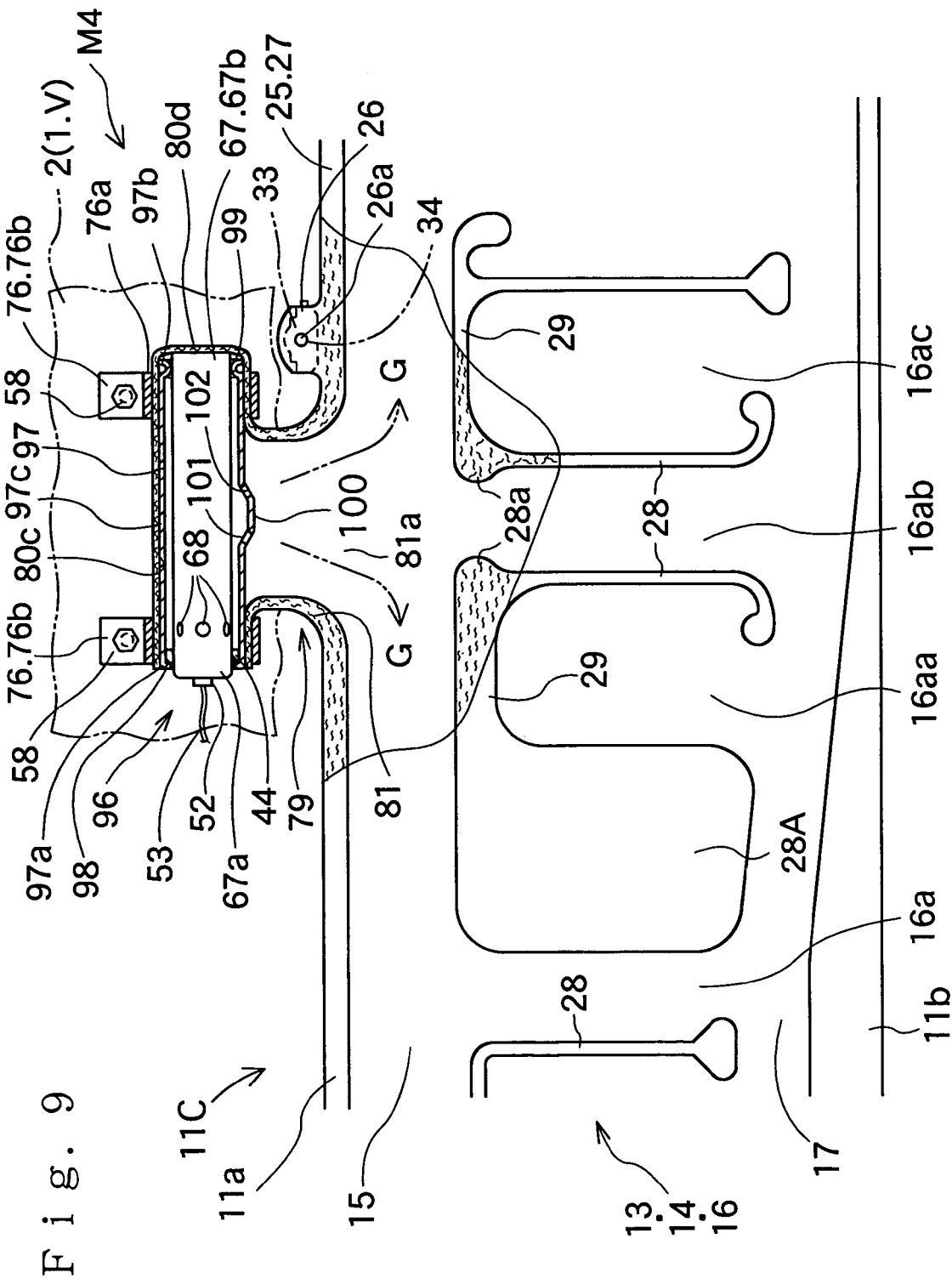
FIG. 9 is a partially enlarged section of the vicinity of a connection port portion of an airbag in an airbag device according to a fourth embodiment.
Figure 10:
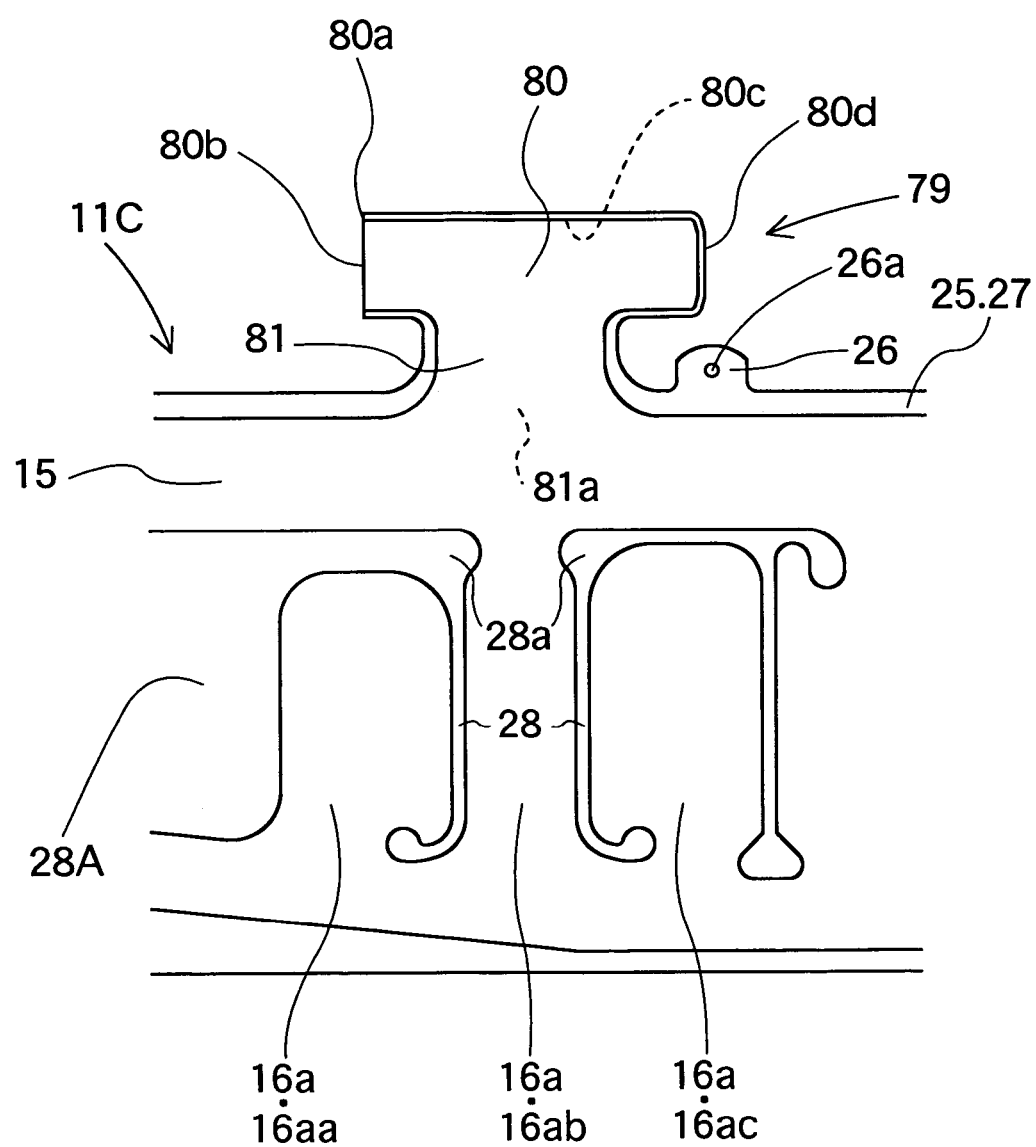
FIG. 10 is a partial front elevation of the vicinity of the connection port portion of the airbag used in the fourth embodiment.

In the third embodiment, moreover, the connection port portion 79 of the airbag 11B is formed into the L-shape, as viewed from the interior compartment, and the inflator 86 is mounted and fixed at its front end side by means of the brackets 93 and 93. As in a fourth embodiment shown in FIGS. 9 and 10, however, an inflator 96 may be mounted and fixed on the inner panel 2 on the side of the body 1 at the both front and rear ends of the connection port portion 79 on either side of the outlet side portion 81, even if this connection port 79 has an L-shape, as viewed from the interior compartment.

In this fourth embodiment, an airbag 11C is closed on the side of the rear end 80d apart from the opening 80b in the inlet side portion 80 of the connection port portion 79 and protrudes to the rear end 80d to the rear side of the outlet side portion 81. In this point, the airbag 11C differs from the connection port portion 79 of the airbag 11B of the third embodiment, but the remaining constructions are similar to those of the airbag 11B of the third embodiment.

And, the inflator 96 is provided with a diffuser 97 and the body portion 67 identical to that of the second and third embodiments. The diffuser 97 is formed of a sheet metal into a generally cylindrical shape to cover the gas discharge ports 68 of the body portion 67, and is assembled with the body portion 67 by having its two ends forced into contact with the outer circumference of the body portion 67.

The diffuser 97 is provided, on the side of its leading end (or front end) 97a, with a flange portion 98 protruded to the inner circumference and, on the side of its root portion (or rear end) 97b, with a curved portion 99, which is so curved toward the inner circumference as to closely contact with the entire outer circumference of the body portion 67. Below the vicinity of the longitudinal middle portion of the diffuser 97, moreover, there is formed a bulge 100 which is protruded downward in a frusto-conical shape. In the slope of the bulge 100, there are formed two gas outlet ports 101 and 102 opened in circular shapes. These gas inlet ports 101 and 102 release the inflating gas G individually downward or in the direction generally perpendicular to the axial direction of the body portion 67 and the diffuser 97 of the inflator 96. When the airbag device is mounted on the vehicle, specifically, the gas outlet port 101 releases the inflating gas G obliquely, forward and downward. Thus, the released gas G is guided through the communication port 81a of the outlet side portion 81 of the connection port portion 79 to the front side of the feed passage portion 15 in the inflation portion 14 of the airbag 11C. The gas outlet port 102 releases the inflating gas G obliquely, rearward and downward. The released gas G is guided through the communication port 81a of the outlet side portion 81 of the connection port portion 79 to the rear side of the feed passage portion 15 in the inflation portion 14 of the airbag 11C.

The diffuser 97 is assembled with the body portion 67 by arranging the O-ring 44 in the inner side face of the flange portion 98 and by mounting the curved portion 99 of the side of the root portion 97b over the body portion 67 from the side of the front end 67a. And, the flange portion 98 is forced to contact with the outer circumference of the leading end 67a while interposing the O-ring 44, and the curved portion 99 is pressed against the outer circumference of the root portion 67b. Thus, the diffuser 97 is assembled with the body portion 67 while the front and rear ends 97a and 97b are finely sealed with the outer circumference of the body portion 67. As a result, the inflator 96 is assembled.

For connecting the assembled inflator 96 to the connection port portion 79, the root portion 97b of the diffuser 97 is inserted, while the gas outlet ports 101 and 102 being directed downward, from the opening 80b of the front end 80a into the inlet side portion 80 in the connection port portion 79 of the airbag 11C. Then, the vicinity of the front end portion 80a and the vicinity of the rear end portion 80d of the inlet side portion 80 are forced, while being held by the holding portions 76a of the mounting brackets 76, into contact with the front and rear ends of the inflator 96, i.e., the front and rear ends 97a and 97b of the diffuser 97. Thus, the inflator 96 is connected to the connection port portion 79.

At this connecting time, the airbag 11C is folded as in the first embodiment, and has the mounting brackets 33 attached thereto. Moreover, the gas outlet ports 101 and 102 of the diffuser 97 face toward the communication port 81a of the connection port portion 79 above the communication port 81a and are arranged to face toward the feed passage portion 15 of the inflation portion 14.

After the inflator 96 is connected to the connection port portion 79, the airbag 11C and the inflator 96 are mounted and fixed on the vehicle V by using the mounting bolts 34 and 58, as in the first embodiment. Then, the airbag device M4 is mounted on the vehicle V.

In this fourth embodiment, when the inflator 96 acts, the inflating gas G is discharged from the gas discharge ports 68. Then, the gas G is injected from the gas outlet ports 101 and 102 of the diffuser 97 through the clearance between the outer circumference of the body portion 67 and the inner circumference of the diffuser 97. Subsequently, the gas G flows through the single connection port portion 79 near the longitudinal middle of the airbag 11C to the front and the rear of the feed passage portion 15 of the inflation portion 14 in the airbag 11C. Even if pressure is applied to the outlet side portion 81 in the direction away from the inflator 96, the upper side inner circumference 80c of the inlet side portion 80 is held firmly by the upper side outer circumference 97c of the diffuser 97 in the inflator 96, thereby to suppress the movement of the outlet side portion 81. Therefore, the fourth embodiment achieves the same working-effects as those of the first embodiment, although the inlet side portion 80 of the connection port portion 79 in the airbag 11C is not provided with the two openings on the front and rear on either side of the outlet side portion 81. Moreover, the inflator 96 can be stably mounted and fixed on the vehicle V.

Figure 11:
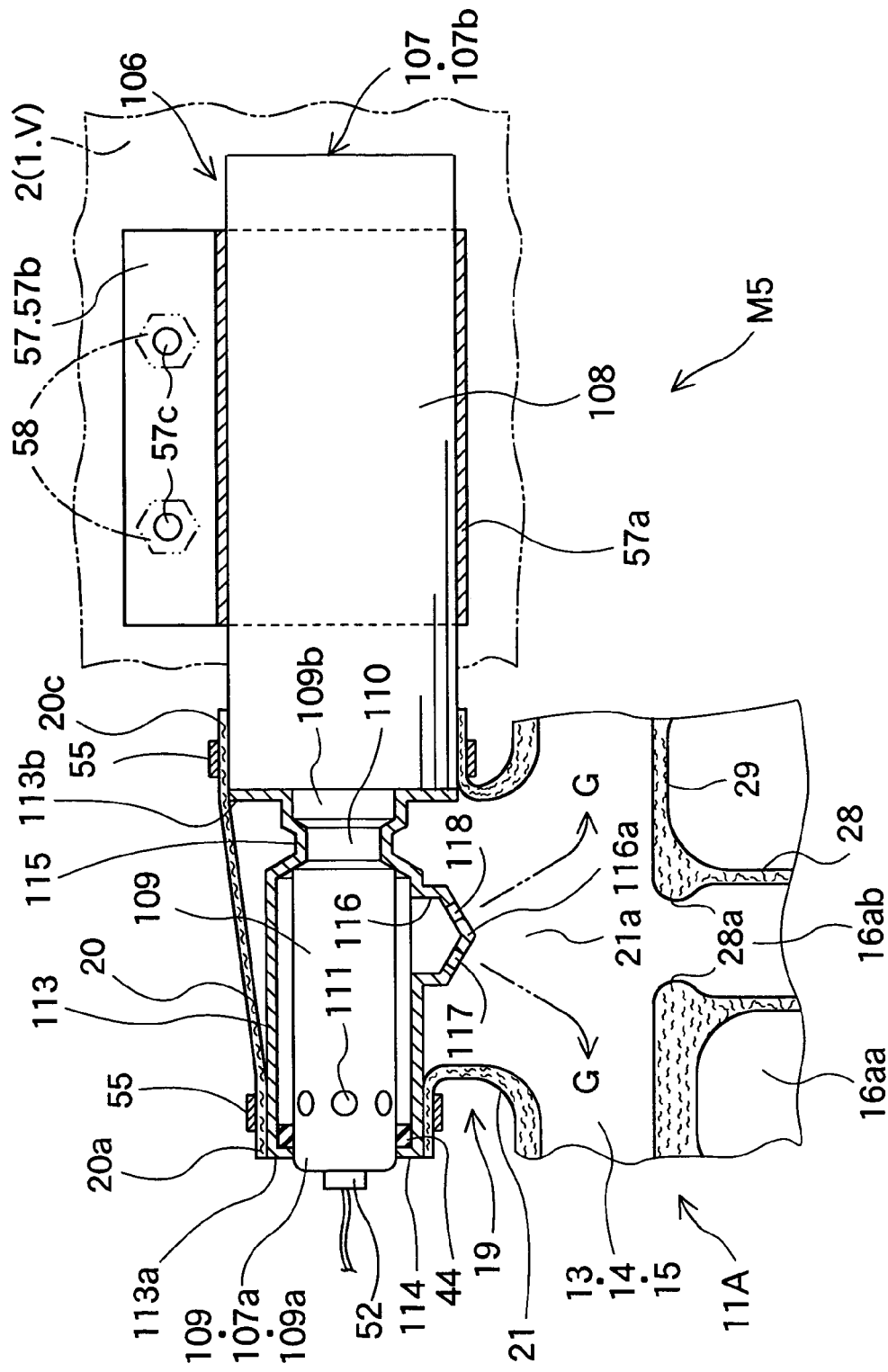
FIG. 11 is a partially enlarged section of the vicinity of an inflator in an airbag device of a fifth embodiment.

Here, the gas outlet port to be formed in the diffuser of the inflator may enter into the side of the outlet side portion 21 in the connection port portion 19 of the airbag 11A, as shown in FIG. 11. This inflator 106 is constructed to include a body portion 107 and a diffuser 113. The body portion 107 is formed into a cylinder type having gas discharge ports 111 open on the outer circumference for discharging the inflating gas G. The diffuser 113 is formed of a metal into a generally cylindrical shape which extends over the gas discharge ports 111 of the body portion 107 and is connected with the body portion 107 by pressing its two ends on the outer circumference of the body portion 107.

The body portion 107 is of a stored gas type, charged with a cold gas, and is provided with a base portion 108 and a head portion 109. The base portion 108 is formed into a generally cylindrical shape and is arranged on the side of the rear end 107b of the body portion 107. The head portion 109 is formed into a generally cylindrical shape having a slightly smaller diameter than the base portion 108 and is arranged on the side of the front end (or leading end) 107a of the body portion 107. The gas discharge ports 111 are arranged in the outer circumference close to the leading end 109a of the head portion 109, and the connector 52 for inputting action signals from the action circuit of an airbag device M5 is connected to the leading end face of the head portion 109. Close to the root portion 109b of the head portion 109, moreover, there is arranged a groove 110, which extends in the entire circumferential direction, for mounting the diffuser 113.

The diffuser 113 is formed of a sheet metal into a generally cylindrical shape and is provided, on the side of its leading end (or front end) 113a, with a flange portion 114 protruded to the inner circumference and, on the side of its root portion (or rear end) 113b, with a caulking portion 115 to be fitted in the groove 110 of the body portion 107. On the front side of the caulking portion 115, there is formed a cylindrical portion 116 with a bottom wall, which is protruded downward. The bottom wall 116a of the cylindrical portion 116 is formed into a conical shape and is provided with two gas outlet ports 117 and 118, which are opened in circular shapes. These gas outlet ports 117 and 118 release the inflating gas G downward or in the direction substantially perpendicular to the axial direction of the body portion 107 and the diffuser 113 of the inflator 106. When the airbag device is mounted on the vehicle, specifically, the gas outlet port 117 releases the inflating gas G obliquely, forward and downward. The released gas G is guided through the communication port 21a of the outlet side portion 21 of the connection port portion 19 to the front of the feed passage portion 15 in the inflation portion 14 of the airbag 11A. The gas outlet port 118 releases the inflating gas G obliquely, rearward and downward. The released gas G is guided through the communication port 21a of the outlet side portion 21 of the connection port portion 19 to the rear of the feed passage portion 15 in the inflation portion 14 of the airbag 11A.

This diffuser 113 is connected with the body portion 107 by arranging the O-ring 44 on the inner face of the flange portion 114 and by mounting the diffuser on the head portion 109 of the body portion 107 from the side of the diffuser root portion 113b. And, the flange portion 114 is applied to the outer circumference of the leading end of the head portion 109 while interposing the O-ring 44, and the caulking portion 115 is fitted in the groove 110. Then, the diffuser 113 is mounted on the body portion 107 while the front and rear ends 113a and 113b are finely sealed against the head portion 109 of the body portion 107. As a result, the inflator 106 is assembled.

This inflator 106 is connected to the connection port portion 19 by means of the clamps 55 and 55, as in the first embodiment, and is mounted and fixed on the vehicle V by means of the mounting brackets 57.

The airbag device M5 using this inflator 106 achieves the same working-effects as those of the first embodiment. In the airbag device M5, moreover, the gas outlet ports 117 and 118 are entered into the outlet side portion 21 of the connection port 19 and thus toward the inflation portion 14 of the airbag 11A. Therefore, the inflating gas G coming from the gas outlet ports 117 and 118 smoothly flows through the communication port 21a of the outlet side portion 21 in two oblique directions, i.e., forward and downward, and rearward and downward, into the feed passage portion 15 of the inflation portion 14. Thus, the gas G quickly reaches the two longitudinal ends of the inflation portion 14 so that the quick expansion and inflation of the airbag 11A is secured in the airbag device M5.

If the aforementioned point is not considered important, one gas outlet port for releasing the inflating gas G downward may be arranged in the bottomed cylindrical portion 116 which is protruded below the diffuser 113.

On the other hand, the inflators 36, 66, 86, 96 and 106 of the foregoing embodiments have been exemplified by the stored type, which are charged with a cold gas. However, the invention may use an inflator of the hybrid type or the like using reactive (or combustion) gas by chemical reactions.

Moreover, in the connection port portion of each airbag or in the vicinity of the communication port in the feed passage portion, there may be arranged, in addition to the diffuser, a flexible commutating cloth, which releases the inflating gas to the front and rear of the airbag, or to the three sides, i.e., to the front, rear and lower sides of the airbag.

What is claimed is:

1. A head protecting airbag device comprising:
an airbag folded and housed in the upper longitudinal edge of the window on the interior side of a vehicle and adapted to expand and inflate downward, when it admits an inflating gas, to cover the interior side of said window; and
an inflator for feeding said airbag with the inflating gas, wherein said airbag includes:
   an inflation portion to inflate, when it admits the inflating gas, to separate an interior side wall portion and an exterior side wall portion of the airbag, thereby to shield said window; and
   one tubular connection port portion arranged close to the longitudinal middle of an upper edge side of said airbag and formed to communicate with said inflation portion and to protrude upward from said inflation portion, for guiding the inflating gas from said inflator to said inflation portion,
wherein said connection port portion includes:
   an outlet side portion having a communication port at a lower end thereof for communicating with said inflation portion and releasing the inflating gas to said inflation portion; and
   an inlet side portion arranged above said outlet side portion and connected to said inflator for admitting the inflating gas from said inflator,
wherein said inflator includes:
   a cylindrical body portion having a gas discharge port opened on the outer circumference side for discharging the inflating gas; and
   a diffuser formed of a metal into a cylindrical shape to extend over said gas discharge port of said body portion, wherein the diffuser is connected to a body portion of the inflator in a sealed manner at each of two ends of the diffuser, and a gas outlet port is formed on an outer periphery of the diffuser, and the inflation gas discharged from the discharge port is released from the outlet port, and
wherein the diffuser of said inflator is:
   inserted into the inlet side portion of the connection port portion of said airbag and connected to said connection port portion with good sealing properties; and
   arranged so that said gas outlet port faces toward said communication port of said connection port portion and thus toward said inflation portion, and
   wherein, in the connection port portion, said inlet side portion is bent with respect to an upper side of said outlet side portion, at least when mounted on the vehicle, to form an L-shape, such that the inlet side portion is perpendicular to the outlet side portion.

2. The head protecting airbag device according to claim 1, wherein, in an inner space of the diffuser is sealed from an exterior space, which is outside of the airbag and the diffuser, and a clearance is defined in the inner space of the diffuser between the outer circumference of said body portion and the diffuser.

3. A head protecting airbag device comprising:
an airbag folded and housed in an upper longitudinal edge of the window on the interior side of a vehicle and adapted to expand and inflate downward, when it admits an inflating gas, to cover the interior side of said window; and
an inflator for feeding said airbag with the inflating gas, wherein said airbag includes:
   an inflation portion to inflate, when it admits the inflating gas, to separate an interior side wall portion and an exterior side wall portion of the airbag, thereby to shield said window; and
   one tubular connection port portion arranged close to the longitudinal middle of an upper edge side of said airbag and formed to communicate with said inflation portion and to protrude upward from said inflation portion, for guiding the inflating gas from said inflator to said inflation portion,
wherein said connection port portion includes:
   an outlet side portion having a communication port at a lower end thereof for communicating with said inflation portion and releasing the inflating gas to said inflation portion; and
   an inlet side portion arranged above said outlet side portion and connected to said inflator for admitting the inflating gas from said inflator,
wherein said inflator includes:
   a cylindrical body portion having a gas discharge port opened on the outer circumference side for discharging the inflating gas; and
   a diffuser formed of a metal into a cylindrical shape to extend over said gas discharge port of said body portion, wherein the diffuser is connected in a sealed manner to a body portion of the inflator at each of two ends of the diffuser, and a gas outlet port is formed on an outer periphery of the diffuser, and the inflation gas discharged from the discharge port is released from the outlet oil and
wherein the diffuser of said inflator is:
   inserted into the inlet side portion of the connection port portion of said airbag and connected to said connection port portion with good sealing properties; and
   arranged so that said gas outlet port faces toward said communication port of said connection port portion and thus toward said inflation portion, and
   attached to the vehicular body at each of front and rear sides of said outlet side portion.

4. The head protecting airbag device according to claim 3, wherein, in an inner space of the diffuser is sealed from an exterior space, which is outside of the airbag and the diffuser, and a clearance is defined in the inner space of the diffuser between the outer circumference of said body portion and the diffuser.

* * * * *